United States Patent
Sahraei et al.

(10) Patent No.: US 12,328,276 B2
(45) Date of Patent: Jun. 10, 2025

(54) EFFICIENT CHANNEL SOUNDING THROUGH ANALOG AGGREGATION

(71) Applicant: QUALCOMM Incorporated, San Diego, CA (US)

(72) Inventors: Saeid Sahraei, San Diego, CA (US); Muhammad Sayed Khairy Abdelghaffar, San Jose, CA (US); Renqiu Wang, San Diego, CA (US); Joseph Patrick Burke, San Diego, CA (US); Tingfang Ji, San Diego, CA (US); Vijay Kumaravelu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 17/812,643

(22) Filed: Jul. 14, 2022

(65) Prior Publication Data
US 2024/0022367 A1 Jan. 18, 2024

(51) Int. Cl.
*H04L 5/00* (2006.01)
*H04B 7/06* (2006.01)

(52) U.S. Cl.
CPC ......... *H04L 5/0048* (2013.01); *H04B 7/0686* (2013.01)

(58) Field of Classification Search
CPC .... H04L 5/0048; H04L 5/0023; H04B 7/0686
See application file for complete search history.

(56) References Cited

U.S. PATENT DOCUMENTS

| | | | |
|---|---|---|---|
| 2004/0033791 A1* | 2/2004 | Schmidl | H04B 7/0634 455/137 |
| 2007/0191067 A1* | 8/2007 | Nguyen | H04B 7/0641 455/562.1 |
| 2017/0331533 A1* | 11/2017 | Strong | H04L 25/0204 |
| 2020/0212978 A1* | 7/2020 | Zhao | H04B 7/0404 |
| 2020/0212979 A1* | 7/2020 | Shim | H04L 5/0048 |
| 2022/0021423 A1* | 1/2022 | Ahmed | H04L 5/0051 |
| 2022/0103324 A1* | 3/2022 | Ly | H04L 5/0048 |

* cited by examiner

*Primary Examiner* — Kan Yuen
(74) *Attorney, Agent, or Firm* — Arent Fox, LLP / Qualcomm

(57) ABSTRACT

Aspects are provided which allow a network entity to consider an identity property for received RS during analog combining or aggregation in order to achieve efficient channel sounding and estimation. The network entity may receive an RS in a time period via a plurality of antenna elements. The network entity may combine, in an analog domain, the RS received via each of the antenna elements based at least in part on weights associated with the antenna elements. At least one weight of the weights changes over the time period, and the weights are elements of a time domain orthogonal cover code or a DFT matrix. As a result of these weights, the network entity may estimate multiple combined or individual channels of antenna elements or groups from one or more RS in one or more symbols, potentially improving UE energy efficiency, efficient resource allocation, and coherency between the antenna elements.

30 Claims, 22 Drawing Sheets

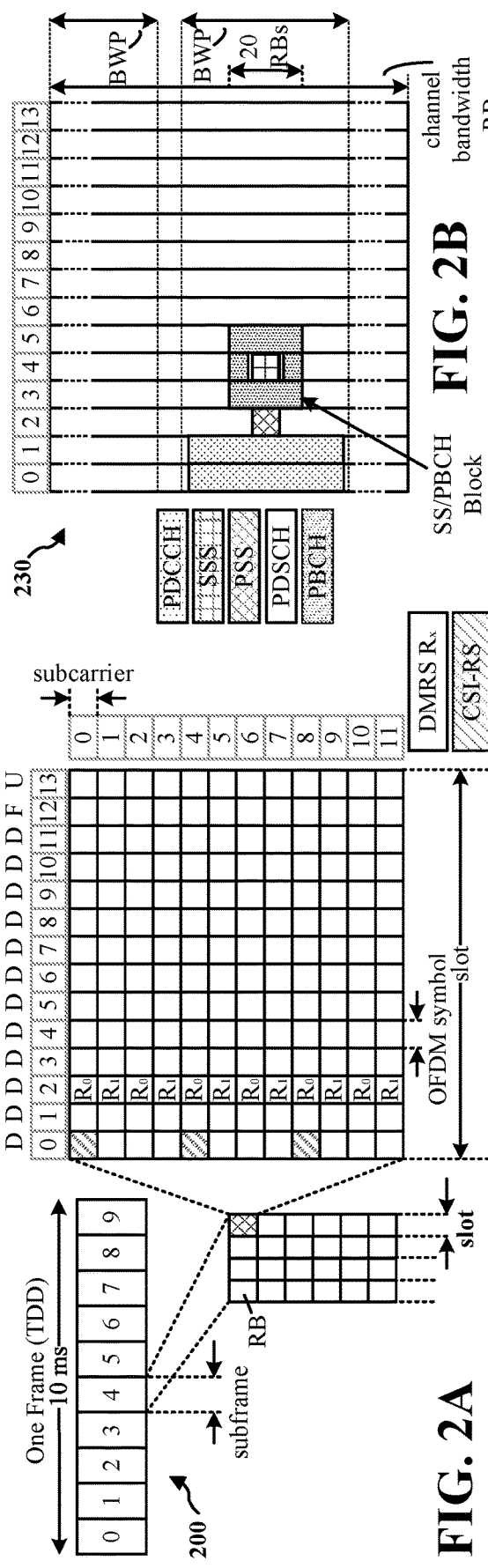
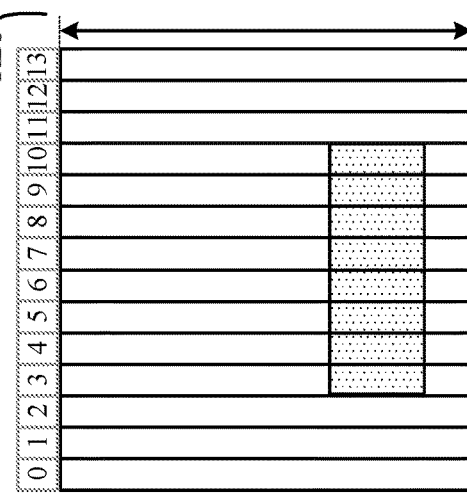
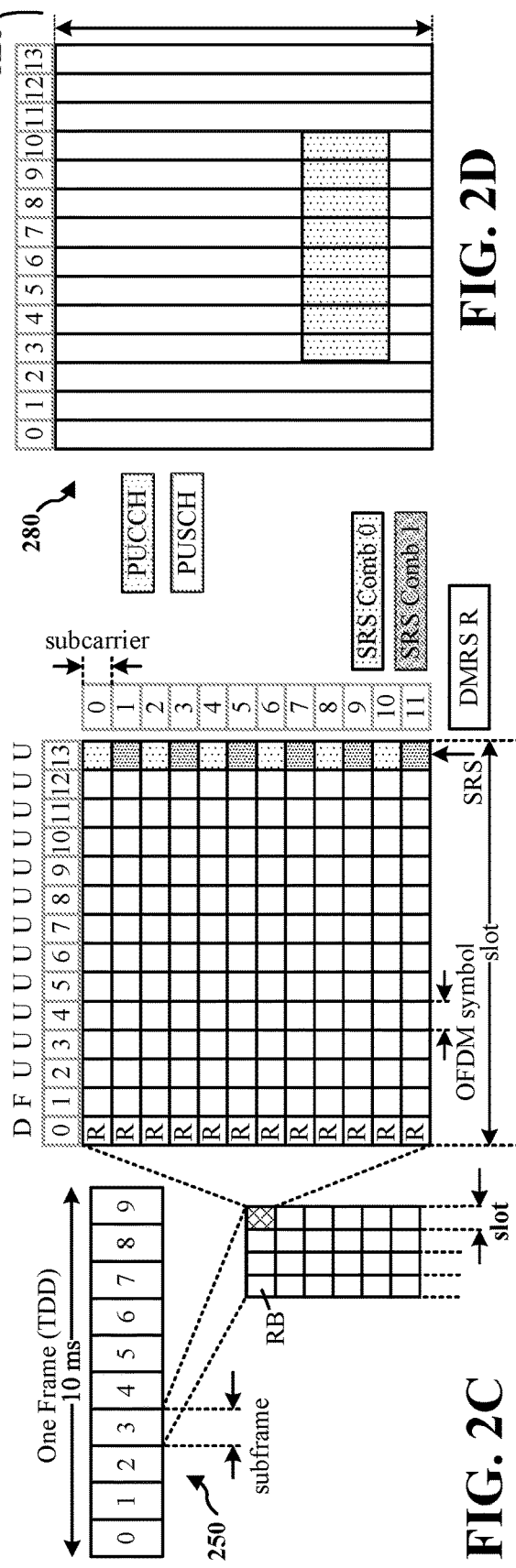

800

820

840

860

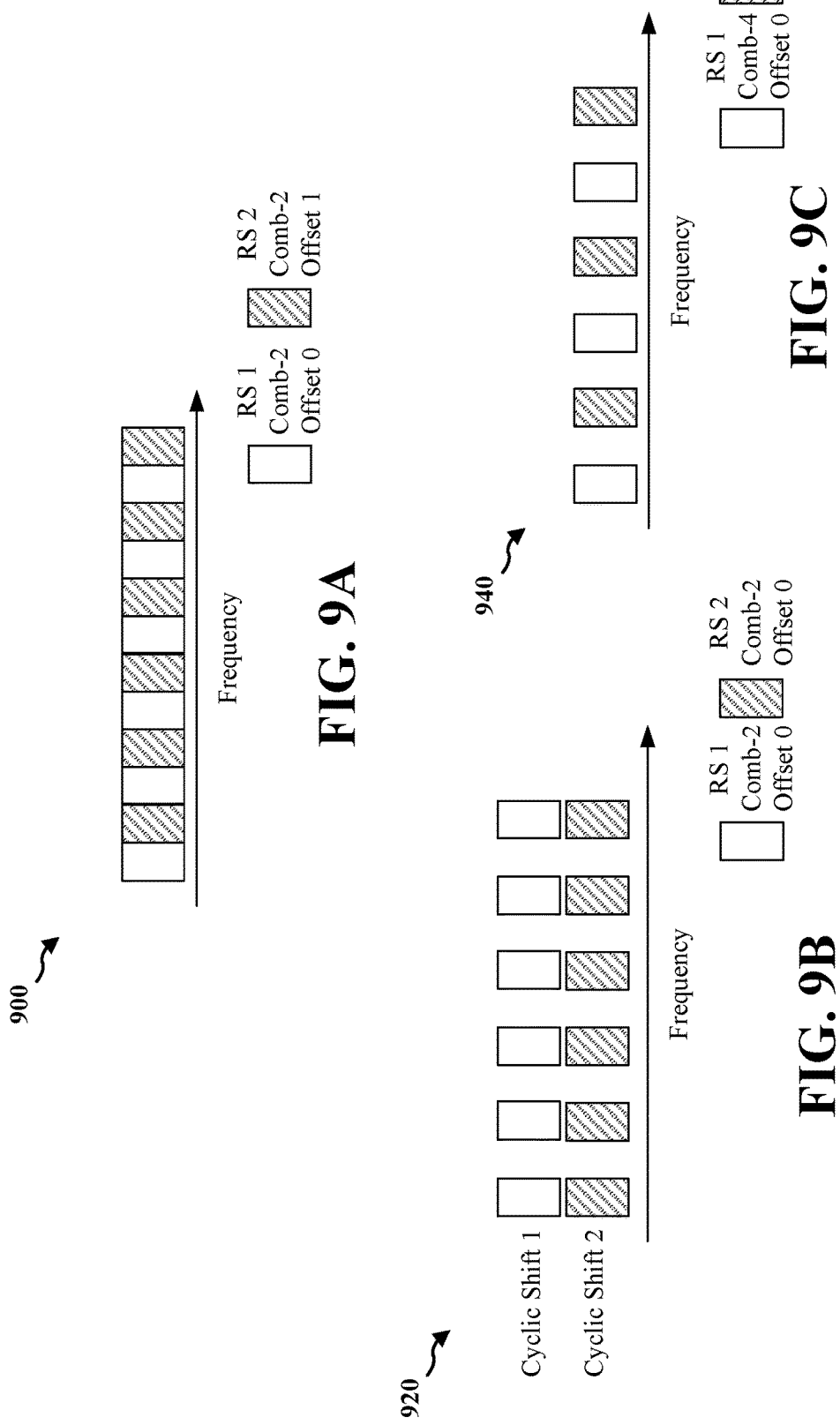

1600

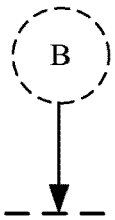

1614
Aggregate, in a First Aggregation, in the Analog Domain, the RS Received Via Each of the Plurality of Antenna Elements Based at Least in Part on a First Function of the First Combination and the Second Combination During the First Portion of the Symbol

1616
Aggregate, in a Second Aggregation, in the Analog Domain, the RS Received Via Each of the Plurality of Antenna Elements Based at Least in Part on a Second Function of the First Combination and the Second Combination During the Second Portion of the Symbol

1618
Provide the First Combination and the Second Combination to Another Network Entity for Channel Estimation of a Combined Channel for the Plurality of Antenna Elements

FIG. 16B

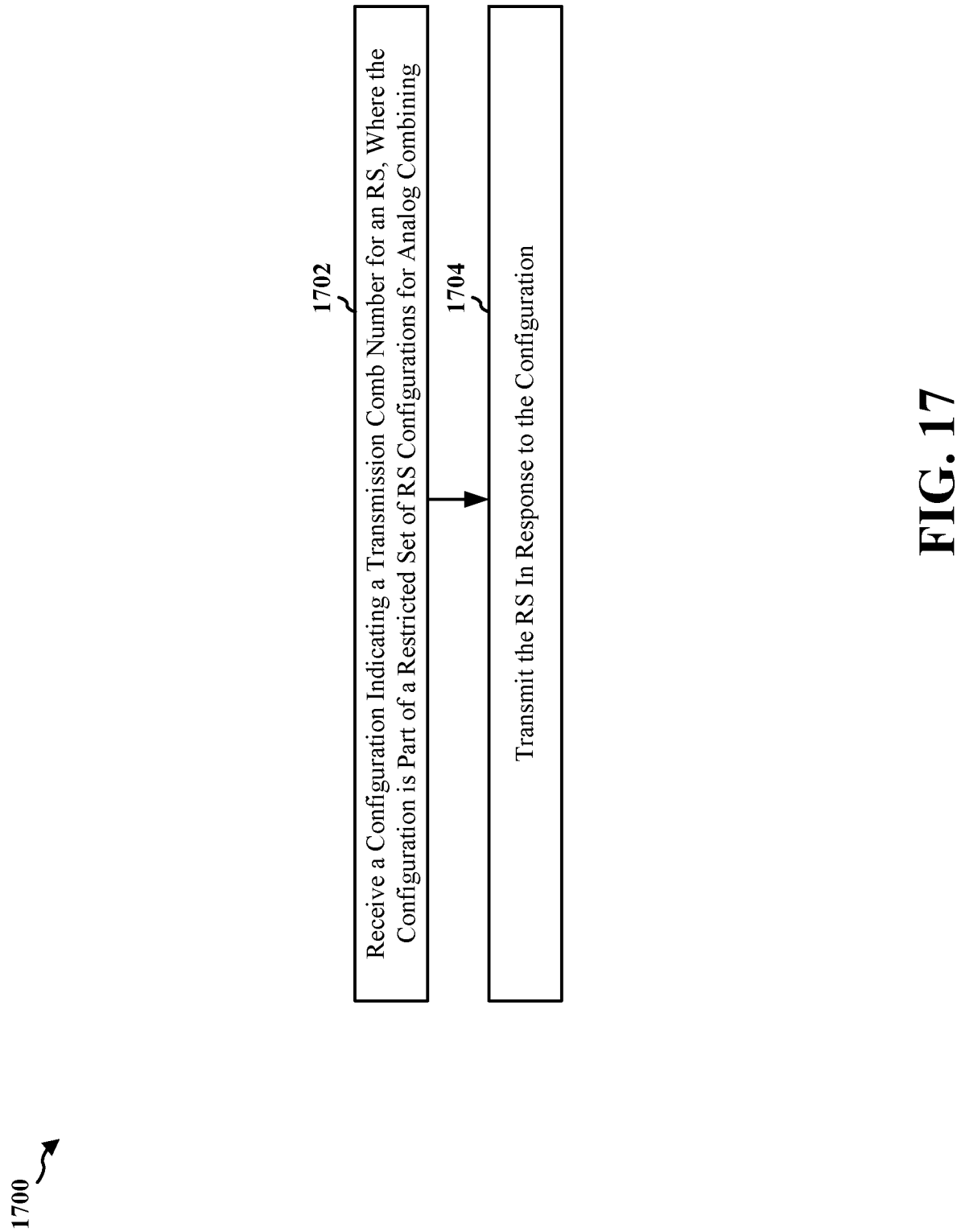

EFFICIENT CHANNEL SOUNDING THROUGH ANALOG AGGREGATION

BACKGROUND

Technical Field

The present disclosure generally relates to communication systems, and more particularly, to a wireless communication system between a user equipment (UE) and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a network entity, for example, a base station. The network entity receives a reference signal (RS) in a time period via a plurality of antenna elements. The network entity combines, in an analog domain, the RS received via each of the plurality of antenna elements based at least in part on weights associated with the plurality of antenna elements. At least one weight of the weights changes over the time period, and the weights are elements of a time domain orthogonal cover code or a discrete Fourier transform (DFT) matrix.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 9A-9C are diagrams illustrating examples of a multiplexed signal including RSs from different UEs according to different RS configurations.

FIGS. 16A-16D are a flowchart of a method of wireless communication at a network entity.

FIG. 17 is a flowchart of a method of wireless communication at a UE.

DETAILED DESCRIPTION

Figure 1:
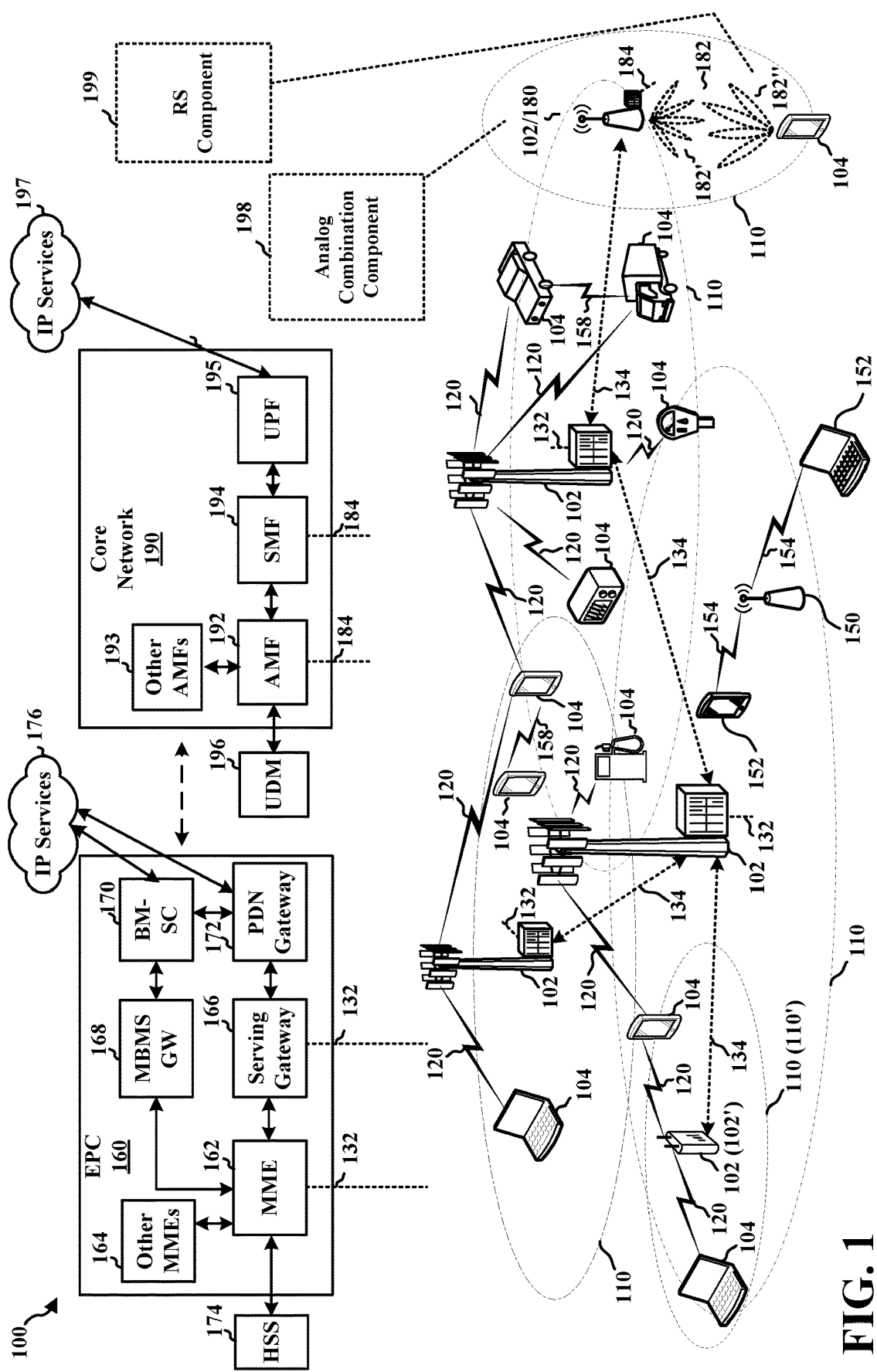
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Analog combining refers to the process of linearly combining a signal received by multiple antennas in the analog domain, also known as Radio frequency (RF) domain, before the signal is converted to the digital domain. To combine a signal received by multiple antennas in the analog domain, a phase shifter of each antenna may be configured with an analog weight (e.g., a beam weight). These analog weights may be, for example, complex weights applied to different phases of the signal received at each antenna to make the phases uniform for combining at the receiver.

The base station may apply analog combining on a received reference signal (RS) (e.g., a sounding reference signal (SRS), a random access channel (RACH) preamble or other message, or a demodulation reference signal (DMRS)) via multiple antenna elements prior to performing channel estimation on the combined signals. Typically, the base station includes a RxFE and a baseband modem which interfaces with the RxFE via multiple RF chains or TxRUs. The RxFE may include a plurality of antenna elements grouped together in multiple subarrays (for example, four antenna elements per group), and a plurality of combiners (e.g., analog signal adders) respectively associated with each of the subarrays or groups. Each combiner adds the signal received by each of the antenna elements in a respective group, and outputs the combined signal over a respective TxRU to the baseband modem. After the baseband modem receives a combined signal from the RxFE via a respective TxRU, the baseband modem may perform channel estimation on the combined channel associated with that TxRU.

However, it is possible that the number of combined signals output from the RxFE over TxRUs may be larger than the number of combined signals or TxRUs that the baseband modem may support at a given time. In such cases, the base station can only process a received RS from only a portion of the antenna elements or TxRUs at a given time. In order to process the remaining portion of the antenna elements or TxRUs, the base station can switch its interface with the RxFE to different TxRUs at different times. Yet, this switching requires the UE to transmit multiple repetitions of the RS for the base station to apply in its channel estimation process, resulting in inefficient channel sounding and estimation due to increased UE power consumption, wasted RS resource allocations, and lack of coherency between the antenna elements associated with the switched TxRUs.

Therefore, to accomplish more efficient channel sounding and estimation through analog combining or aggregation, the base station may consider an identity property for a received RS. The identity property provides that, for a received RS configured with at least a transmission comb N (where N≥2), the RS received by an antenna element during each 1/Nth portion of a symbol is approximately identical to the RS received by the antenna element during each other 1/Nth portion of the symbol. As an example, for a received RS configured with a transmission comb pattern of comb-2, comb-4, etc. the waveform of the RS during a first half of a symbol may be approximately identical to the waveform of the RS during a second half of the symbol. Similarly, an RS having at least a comb-4 pattern may be identical during each quarter of a symbol.

The base station may utilize this identity property when performing analog combining to increase the number of antenna elements considered in a single combination and thereby reduce the number of RS transmissions from a UE. For instance, if the RxFE generally applies 4:1 combiners (one combiner for each group or subarray of 4 antenna elements) for analog combining, the RxFE here may further include an 8:1 combiner to add the signal received via two groups of 4 antenna elements using a different set of analog weights or coefficients respectively during the first half and the second half of the symbol. At least one of the analog weights in one set may be different than a corresponding weight in the other set, and the analog weights may be elements of a time domain orthogonal cover code (TD-OCC) or a discrete Fourier transform (DFT) matrix. After combining the signals in this manner, the base station may recover each of the combined signals output from the combiners to respective TxRUs for channel estimation. For example, the base station may aggregate the two 8:1 combinations using one summation function to recover the analog combined signal for one of the groups of 4 antenna elements, and the base station may again aggregate the two 8:1 combinations using another summation function (e.g., a negative summation or subtraction) to recover the analog combined signal for the other group of 4 antenna elements. Thus, even in cases where the number of TxRUs the baseband modem can support is less than the number of TxRUs of the RxFE, by utilizing this identity property, the base station may estimate multiple combined channels associated with a single received RS during a symbol via different groups of antenna elements, thereby providing improvements to UE energy efficiency, efficient resource allocation, and coherency between the antenna elements.

In addition to recovering and estimating the combined channels associated with respective groups of antenna elements or TxRUs, the base station may recover and estimate the channel associated with each individual antenna element when performing analog combining based on the aforementioned identity property. For instance, the base station may apply various different sets of analog weights at least equivalent in number to the quantity N of antenna elements combined in a given subarray or group. For example, to recover the individual channels for each antenna element associated with a N:1 combiner (which combines the signal received via N antenna elements), the base station may apply N different sets of analog weights respectively for N symbol portions. In one alternative, each analog weight may be an element of a TD-OCC similar to the previous example, but the dimensions of the TD-OCC may be different in this example to accommodate the quantity N of antenna elements in a given group or subarray. In another alternative for orthogonal combining weights, each analog weight may be an element of a DFT matrix, for example a column of a DFT matrix such as:

$$\begin{matrix} +1 & +1 & +1 & +1 \\ +1 & -j & -1 & +j \\ +1 & -1 & +1 & -1 \\ +1 & +j & -1 & -j \end{matrix}$$

where the base station may apply different columns of the DFT matrix respectively for different reception beams (DFT-based beams). As a result, the base station may recover and estimate the individual channels over each of the antenna elements of any given subarray or combined group of antenna elements in the RxFE. For instance, the base station may similarly perform signal combinations and aggregations as in the previous example, but in this example the base station may utilize the N different changes in analog weights to apply N different combinations at different times and N different aggregations of the various combinations. This technique may be applied in cases where the number of TxRUs the baseband modem supports is less than the number of TxRUs of the RxFE, and thus may result in individual channel recovery and estimation from a single RS with similar improvements to UE energy efficiency, efficient resource allocation, and coherency between the antenna elements. Alternatively, this technique may be applied in cases where the number of TxRUs the baseband modem supports is at least equal to the number of TxRUs of the RxFE, and thus may also result in individual channel recovery and estimation from either a single RS or from multiple RSs. For instance, in the case of multiple RSs, rather than applying N different sets of analog weights respectively for N symbols portions to recover the individual channels for each antenna element associated with a N:1 combiner, the base station may apply N different sets of analog weights respectively for N different symbols.

Thus, in response to changing at least one analog weight over time according to a TD-OCC or a DFT-based beam, the base station may recover a combined channel associated with a group or subarray of antenna elements or an individual channel associated with an antenna element in the group or subarray. For instance, the base station may adjust one or more phase shifters in a group of antenna elements by changing the analog weight(s) between one symbol portion or symbol and the next to arrive at various combinations and aggregations, which may allow the base station to recover a combined channel over the TxRU associated with that group of antenna elements (if the weight changes within a symbol) or an individual channel associated with one of the antenna elements in the group. However, each of these analog weights do not change instantly but rather after a transition time (e.g., after 300 ns), and thus the base station may not process any RS samples for channel recovery and estimation during this transition time. In the cases where an analog weight is changed during a symbol, the transition time may occur during a part of each symbol portion. Thus, in such cases, the base station may discard from its channel recovery and estimation process any samples of RS obtained during the transition time(s).

Finally, the aforementioned analog combining techniques including the changing of analog weights across N different symbol portions (where N≥2) assumes that the RS satisfies the aforementioned identity property (e.g., that the RS is configured with at least a transmission comb N and thus that the waveform of the RS is approximately identical in each of N symbol portions). However, in some cases, the base station may receive an RS respectively from multiple UEs in a multiplexed received signal. If the multiplexed RSs result in a received signal that does not include the comb-N transmission pattern, the identity property may no longer be valid and therefore the analog combining techniques described above may no longer apply. For example, in the case where N=2, the base station may expect a received signal multiplexing RSs from two UEs to follow a comb-2 pattern, but if one of the UEs applies a comb-2 pattern with offset 0 to its RS while the other of the UEs applies a comb-2 pattern with offset 1 to its RS, the received multiplexed signal will no longer have a comb-2 pattern and therefore the identity property may no longer be found. To prevent the occurrence of such invalid configurations of the received signal, the base station may restrict the RS configurations so that a multiplexed received signal would still include the comb-N transmission pattern. For example, the base station may configure the RSs of both UEs to have a same transmission comb pattern and a same transmission comb offset but with different cyclic shifts, or to have a same transmission comb pattern but different transmission comb offsets, in order to maintain the expected comb pattern at the receiving end. The base station may include such configurations in a restricted set of valid configurations, and the base station may transmit one such valid configuration from the restricted set to each UE. The UEs may then transmit RS accordingly in response to the received configuration.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the base station 102/180 may include an analog combination component 198 that is configured to receive an RS in a time period via a plurality of antenna elements, and to combine, in an analog domain, the RS received via each of the plurality of antenna elements based at least in part on weights associated with the plurality of antenna elements. At least one weight of the weights changes over the time period, and the weights are elements of a time domain orthogonal cover code or a discrete Fourier transform matrix.

Still referring to FIG. 1, in certain aspects, the UE 104 may include a RS component 199 that is configured to receive a configuration indicating a transmission comb pattern for an RS, where the configuration is part of a restricted set of RS configurations for analog combining, and to transmit the RS in response to the configuration.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
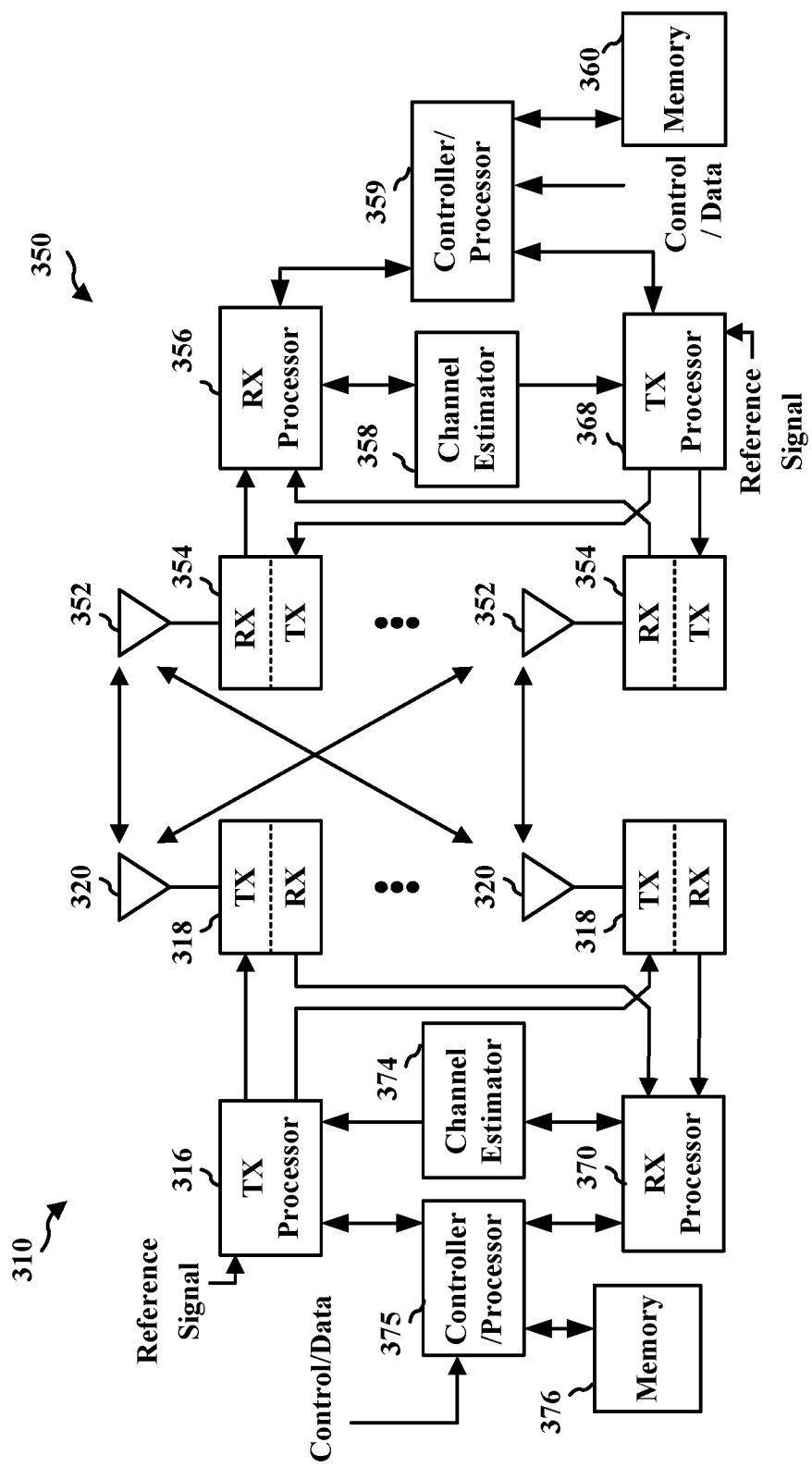
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with analog combination component 198 of FIG. 1.

At least one of the TX processor 368, the RX processor 356, and the controller/processor 359 may be configured to perform aspects in connection with RS component 199 of FIG. 1.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
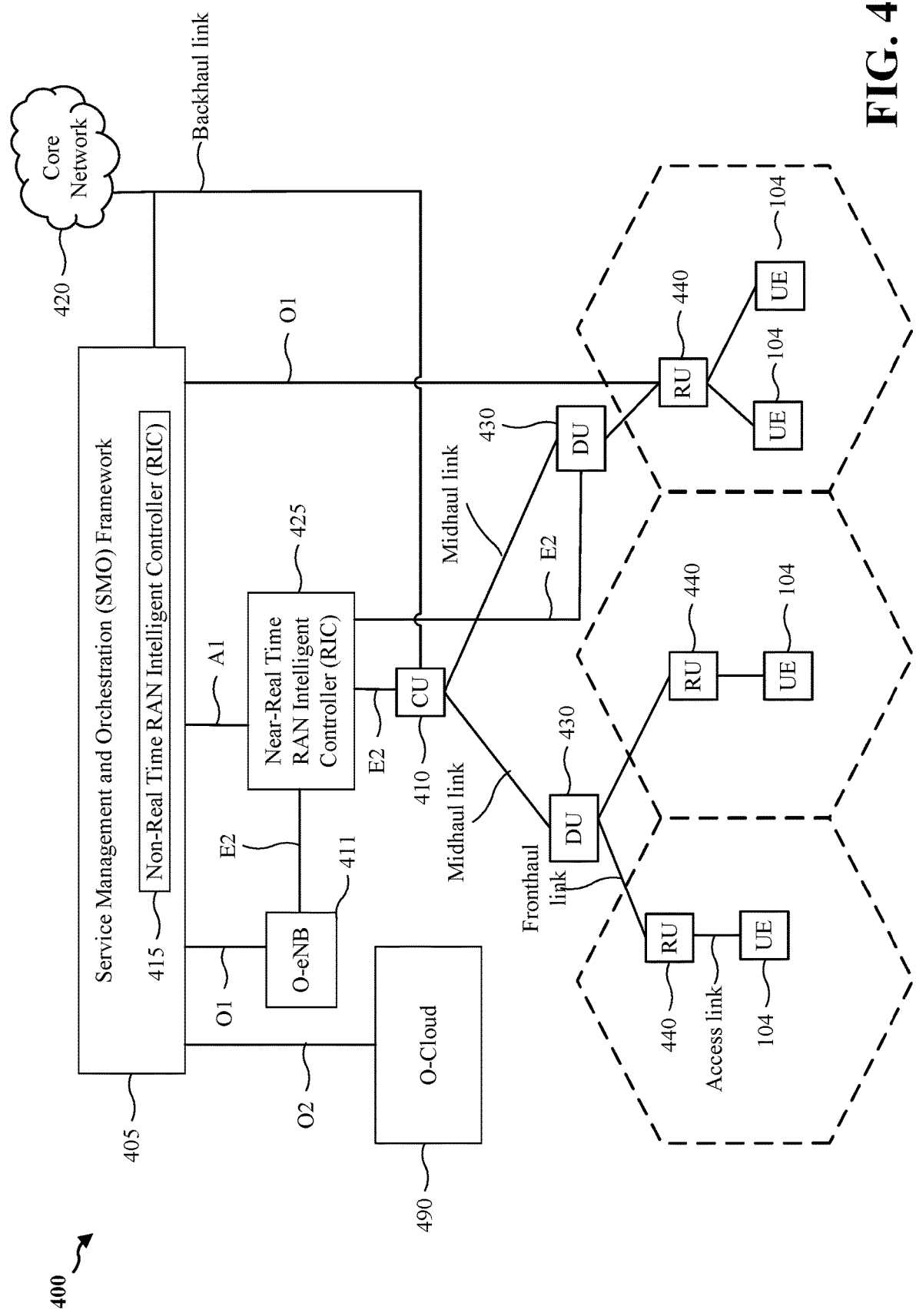
FIG. 4 is a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Analog combining refers to the process of linearly combining a signal received by multiple antennas in the analog domain before the signal is converted to the digital domain. In contrast, digital combining refers to the process of combining a signal received by multiple antennas after the signal has been converted to the digital domain. For instance, in digital combining, the signal received by each antenna may respectively pass through an analog to digital converter (ADC) and low pass filter associated with each antenna prior to being combined with the signal received by the other antennas. In contrast, analog combining allows the signal received by each antenna to be combined prior to such conversion and filtering. For instance, in analog combining, the ADC and low pass filter may be associated with a combination of multiple antennas rather than associated with each single antenna as in digital combining, thereby reducing complexity of implementation and saving cost compared to digital combining.

To combine a signal received by multiple antennas in the analog domain, a phase shifter of each antenna may be configured with an analog weight (e.g., a beam weight). These analog weights may be, for example, complex weights applied to different phases of the signal received at each antenna to make the phases uniform for combining at the receiver. However, configuring these weights in the analog domain is not as flexible as in the digital domain, since for example, each weight may take a few hundred nanoseconds to be changed or transitioned to a different weight, and therefore these weights generally remain fixed from one signal to the next. Additionally, analog weights are not frequency-dependent weights, but weights that generally apply to signals of any frequency in a configured frequency band.

Figure 5:
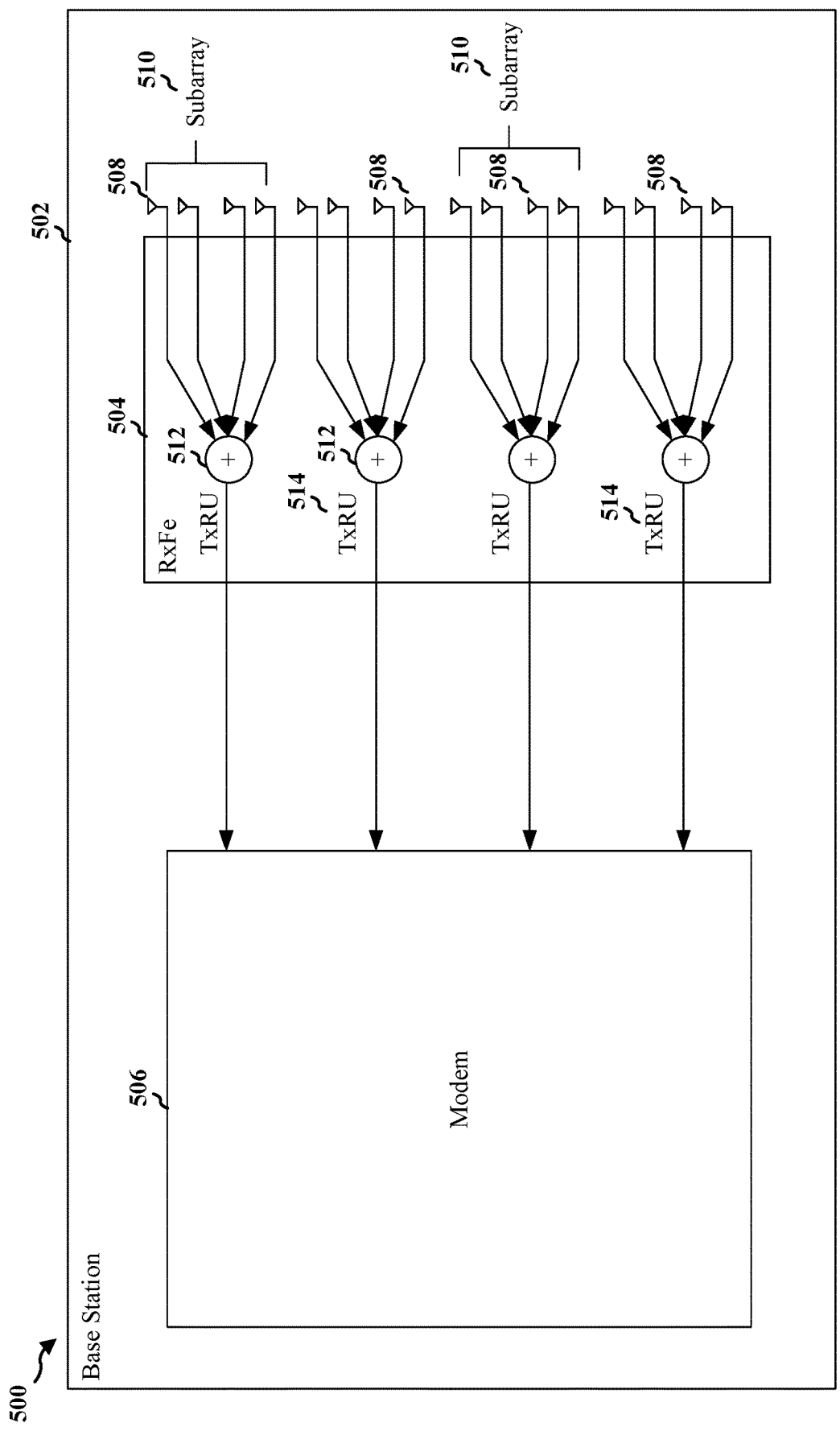
FIG. 5 is a diagram illustrating an example of a base station including a receiver front end (RxFe) and a baseband modem.

FIG. 5 illustrates an example 500 of a base station 502 including a receiver front end (RxFe) 504 and a baseband modem 506. The base station 502 may be an aggregated base station or a disaggregated base station. In one example, the RxFe may be a component of or correspond to RX processor 370 of base station 310 in FIG. 3, and the baseband modem may be a component of or correspond to controller/processor 375 of base station 310 in FIG. 3. In another example, the RxFe may be a component of or correspond to RU 440 in FIG. 4, and the baseband modem may be a component of or correspond to DU 430 or CU 410 in FIG. 4.

The RxFE 504 may include an antenna panel or array including a plurality of antenna elements 508 or ports. Multiple antenna elements may be grouped together in a subarray 510, and the antenna array may include multiple such subarrays. In this example, each of the subarrays includes four antenna elements, although the number of antenna elements in a subarray may be different in other examples.

The RxFe 504 may receive a signal (e.g., a SRS, a RACH signal, or a DMRS from a UE) via each of the antenna elements. Since the signal received at each antenna element typically includes a different phase, the RxFE may include a phase shifter (not shown) for each antenna which applies an analog weight to shift the phase of the received signal at a corresponding antenna. The weights may be configured such that the resulting phases of the signals received by antennas are uniform for a given subarray. The RxFE may also include a combiner 512 (e.g., an analog signal adder) associated with each of the subarrays of antenna elements. In this example, each of the combiners adds together the signal received by four respective antenna elements in a given subarray (that is, each combiner is a 4:1 combiner), although in other examples the number of antenna elements for a given combiner may be different. Each combiner in the RxFE may add the phase shifted signals in a respective subarray, which combined signals may then be passed to the baseband modem 506 via respective RF chains or transceiver units (TxRUs 514). Since the signal received via each antenna element in a subarray is added in-phase by a given combiner, the gain of the combined signals are maximized. Moreover, each of the combined signals may be converted to the digital domain using an ADC (not shown) prior to reception of the combined signals at the baseband modem. After the baseband modem receives the combined and converted signals via each of the TxRUs, the modem may process the signals (e.g., perform channel estimation on each of the combined channels represented by a given TxRU).

Thus, the base station 502 may apply analog combining on a received reference signal (e.g., SRS, RACH, DMRS) via multiple antenna elements 508 prior to performing channel estimation on the combined signals. Analog combining may be more cost effective and less complex than if the base station was to perform digital combining, in which case the signal received via each antenna element would first be converted using a respective ADC to the digital domain before being added together by the combiner 512 for a given one of the subarrays 510. However, it is possible that the number of combined signals output from the RxFE may be larger than the number of combined signals or TxRUs that the baseband modem may support at a given time. For instance, if the baseband modem can only process 4 RF chains at one time but the RxFe outputs 8 combined signals at a time over respective RF chains (e.g., the RxFE includes eight combiners associated respectively with different subarrays of antenna elements), the baseband modem may not process all of the combined signals at the same time. As a result, channel sounding and estimation in such cases may be inefficient since the base station may process a received RS from only a portion of the antenna elements at a given time.

Figure 6:
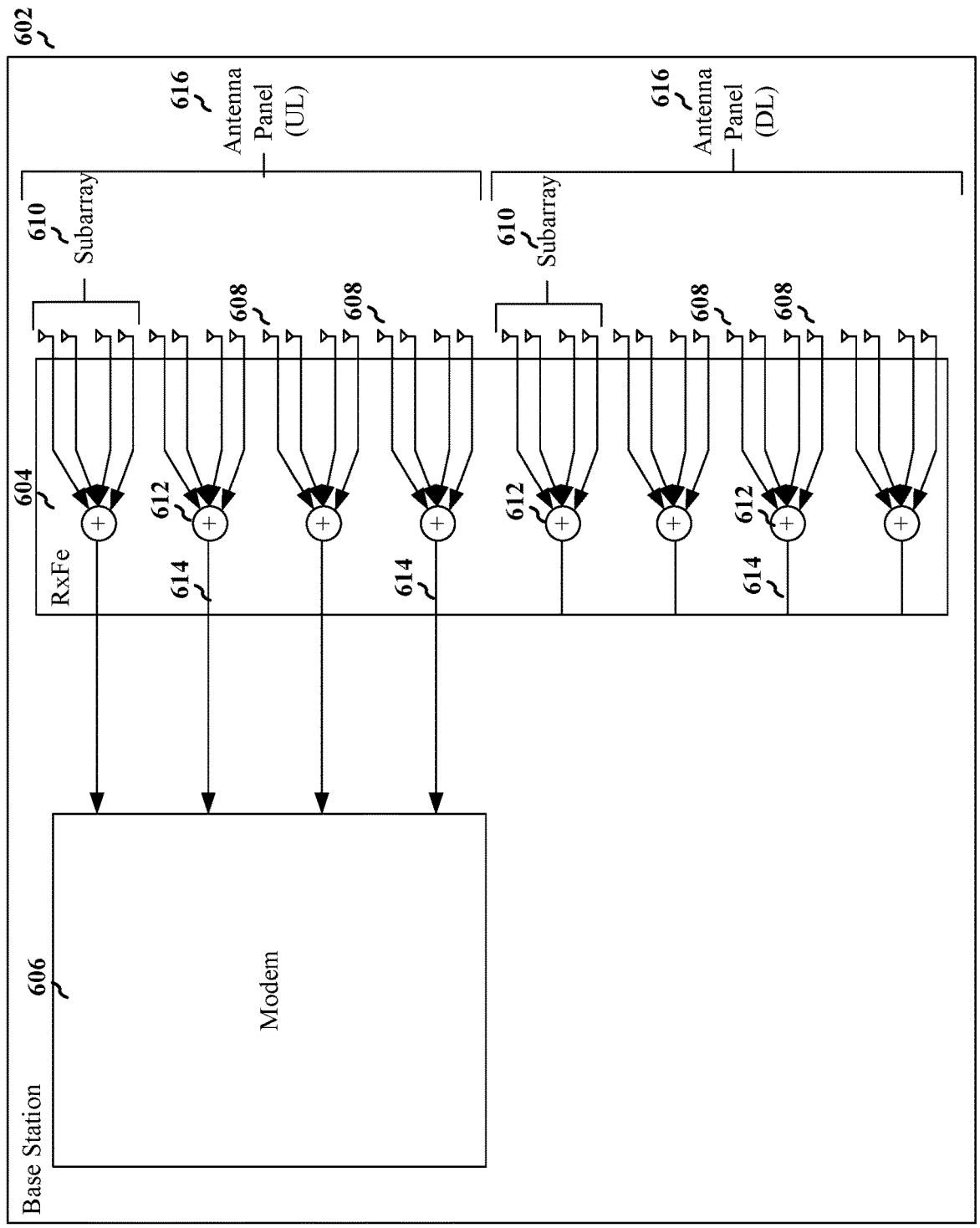
FIG. 6 is a diagram illustrating an example of a base station including an RxFe and a baseband modem where a quantity of transceiver units (TxRUs) output from the RxFE is higher than a quantity of TxRUs supported by the baseband modem at a given time.

FIG. 6 illustrates an example 600 of a base station 602 including an RxFe 604 and a baseband modem 606 similar to their counterparts in the example of FIG. 5, but where a number of combined signals output from the RxFE is higher than a number of TxRUs supported by the baseband modem at a given time. Similar to the RxFE in FIG. 5, the RxFE 604 may include a plurality of antenna elements 608 divided into subarrays 610, and a plurality of combiners 612 which respectively add together a signal received via each of the antenna elements in a given subarray. The combiners in this example are 4:1 combiners similar to the combiners in FIG. 5, although the combiners may be different in other examples. The RxFE may also output combined signals via a plurality of RF chains or TxRUs 614 to the baseband modem 606 for processing.

However, in the example of FIG. 6, the RxFE 604 outputs more combined signals than that the baseband modem 606 may support at a given time. For instance, in the illustrated example, the RxFE may output eight combined signals over respective RF chains (which are each associated with a 4:1 combiner and subarray), while the baseband modem may interface with the RxFE via only four RF chains at a given time. This situation may arise, for example, in cases where the antenna elements 608 are of a plurality of antenna panels 616 respectively configured for reception and transmission at a given time. For instance, in the example RxFE of FIG. 6, half of the antenna elements may be of an uplink antenna panel while the other half of the antenna elements may be of a downlink antenna panel, and thus the baseband modem may interface with only one of the antenna panels to receive RS at a given time. If the configuration of the antenna panels is switched to the reverse of that shown in FIG. 6 (e.g., the top antenna panel is configured for transmission [downlink] while the bottom antenna panel is configured for reception [uplink]), the baseband modem may correspondingly switch its interface with the RxFE such that the modem may receive combined signals via the other four RF chains at a subsequent time. However, this process of receiving multiple RS over different sets of antenna elements at different times may be inefficient for channel sounding and estimation, as further described below with respect to FIG. 7. Moreover, even if the antenna panels were alternatively configured for simultaneous reception (e.g., both panels are for uplink at a given time), the baseband modem 606 still may only support processing a portion of the combined signals received via RF chains at a given time. Thus, similar inefficiencies may be present with respect to channel sounding and estimation even if the antenna elements are all configured for simultaneous reception in different panels, or if the antenna elements are all part of a single antenna panel.

Figure 7:
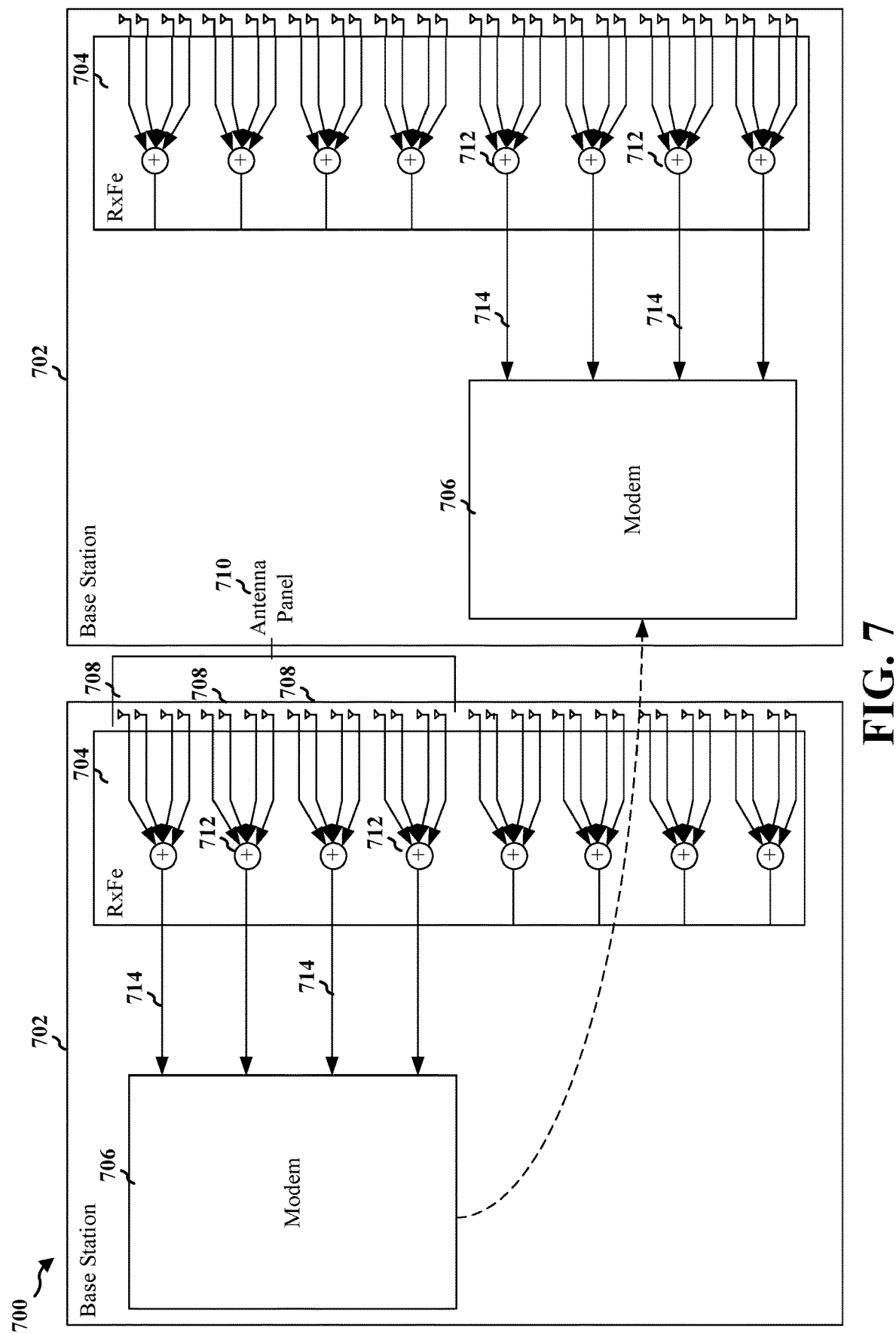
FIG. 7 is a diagram illustrating an example of a base station including an RxFe and a baseband modem which switches its interface with the RxFE such that the modem may receive combined signals via different radio frequency (RF) chains from the RxFE at different times.

FIG. 7 illustrates an example 700 of a base station 702 including an RxFe 704 and a baseband modem 706 which switches its interface with the RxFE such that the modem may receive combined signals via different RF chains from the RxFE at different times. The switching may occur in cases such as illustrated where the RxFE includes more RF chains than that the baseband modem may support at a given time. Similar to the RxFE in FIG. 6, the RxFE 704 may include a plurality of antenna elements 708 in subarrays of different antenna panels 710, and a plurality of combiners 712 which respectively add together a signal received via each of the antenna elements in a given subarray. The combiners in this example are 4:1 combiners similar to the combiners in FIG. 6, although the combiners may be different in other examples. Moreover, in this example, the top antenna panel is for UL and the bottom antenna panel is for DL at a given time, and vice-versa at another given time, although in other examples, the antenna elements may be part of a single antenna panel or part of multiple UL antenna panels at a given time. The RxFE may also output combined signals via a plurality of RF chains or TxRUs 714 to the baseband modem 706 for processing.

In this example, since the RxFE 704 includes more TxRUs 714 than the baseband modem 706 may support at a given time, the base station configures the UE to transmit two RSs at different times. Initially, the baseband modem 706 connects to a portion of the TxRUs 714 (e.g., the RF chains coupled to the combiners 712 associated with the top antenna panel of FIG. 7), and the baseband modem receives the first RS from the UE via the antenna elements 708 in the top antenna panel. The baseband modem may then perform channel estimation of the first RS. Subsequently, the baseband modem 706 connects to a remainder of the TxRUs 714 (e.g., the RF chains coupled to the combiners 712 associated with the bottom antenna panel of FIG. 7), and the baseband modem receives the second RS from the UE via the antenna elements 708 in the bottom antenna panel. The baseband modem may then perform channel estimation of the second RS.

However, such switching between TxRUs 714 for channel sounding and estimation is inefficient for the UE and the base station. For instance, the transmission of two RSs (rather than one) doubles the energy consumption at the UE and wastes resources for RS transmission that may otherwise have been allocated for other purposes (e.g., for receiving data from another UE). Moreover, in cases where the top antenna panel and the bottom antenna panel are configured for simultaneous reception of RS (and subsequently for simultaneous transmission of data to the UE), the base station 702 may not be able to effectively utilize the panels in such manner due to lack of coherence between the respective antenna elements. For instance, a UE generally may not be able to maintain phase coherence between two consecutive RS transmissions due to an inherent randomness of the initial phases of signals transmitted at different times. Moreover, the base station may not account for a phase difference between the two RS transmissions when combining and performing separate channel estimations for the two RSs, and therefore the base station may not utilize these panels for subsequent simultaneous transmissions to the UE in a coherent manner. Accordingly, it would be helpful if the analog combining at the base station was configured differently in such situations to reduce the number of RS transmitted by the UE (e.g., from two RS to one RS), thereby improving UE energy efficiency, reducing RS resource allocations, and providing coherency between the antenna elements.

To accomplish more efficient channel sounding and estimation through analog combining or aggregation (for example, when the RS is comb-2), the base station may apply the following identity property given by Equation 1 to a received RS:

$$x_i(t) \approx x_i\left(t - \frac{T}{2}\right) \text{ for } \frac{T}{2} \leq t < T \quad (1)$$

where T is the duration of the symbol and x is the received signal at time t via antenna element i. This identity property provides that, for a received RS configured with a transmission comb pattern of comb-2 or comb-4, the RS received by an antenna element during a first half of a symbol is approximately identical to the RS received by the antenna element during a second half of the symbol. The received signal in one half of the symbol may be approximately identical, rather than exactly identical, to the received signal in the other half of the symbol due to different noise or slightly different channel conditions between the two symbol halves.

Figure 8A:
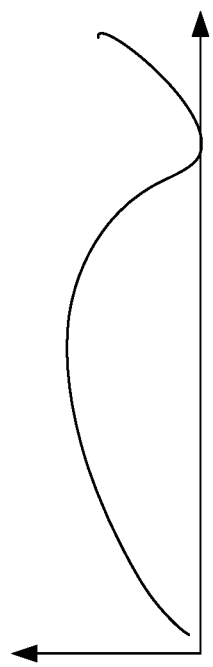
FIGS. 8A-8D are diagrams illustrating an example of an RS received during a symbol which, when the RS is applied with a comb-2 pattern, results in an identity property where the waveform of the RS in one half of the symbol is approximately identical to the waveform of the RS in the other half of the symbol.
Figure 8B:
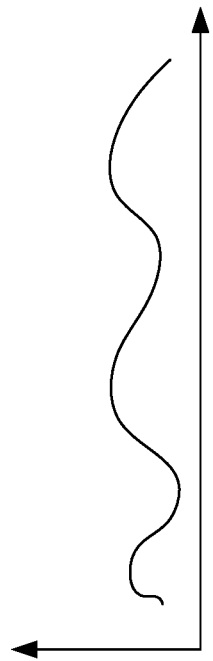
Figure 8C:
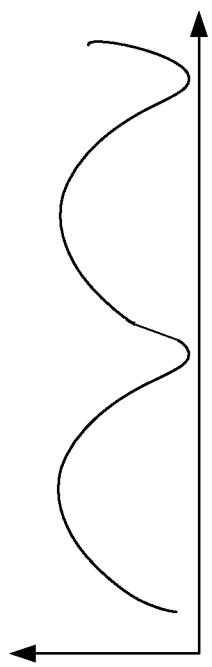
Figure 8D:
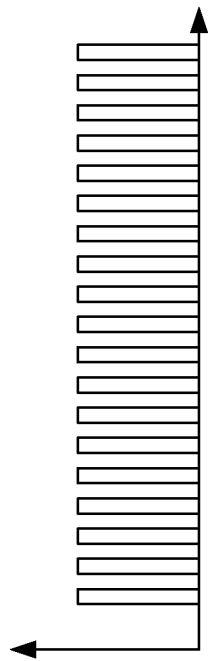

FIGS. 8A-8D illustrate examples 800, 820, 840, 860 respectively of a received RS over a symbol duration of time with a comb-2 pattern which incorporates the aforementioned identity property given by Equation 1. In particular, FIG. 8A illustrates an example waveform of the RS in the frequency domain as a continuous waveform, FIG. 8B illustrates an example waveform of the RS following conversion to the time domain, FIG. 8C illustrates an example pulse train corresponding to a comb-2 pattern which is applied to the RS in the frequency domain, and FIG. 8D illustrates an example waveform of the RS in the time domain following application of the pulse train or comb-2 pattern. These Figures together illustrate that if a received signal occupies inconsecutive tones or subcarriers (such as an RS with a comb-2 or comb-4 pattern), the signal during the first half of the symbol is approximately the same as the signal during the second half of the symbol. This identity property is illustrated in FIG. 8D. Additionally, in a comb-4 pattern, the signal during each quarter of a symbol may be approximately the same.

Although the identity property given by Equation 1 may apply to a received RS from a single UE in inconsecutive subcarriers or resource elements (e.g., having a comb-2 pattern, a comb-4 pattern, etc.), the identity property may become invalid when the received RS is from multiple UEs. For instance, the multiplexing of RS by different UEs with certain transmission combs or transmission comb offsets may result in the received signal no longer being in inconsecutive subcarriers or resource elements. Thus, to maintain the aforementioned identity property for efficient analog combining, the base station may restrict the possible RS configurations (e.g., transmission combs or transmission comb offsets) that a UE may apply when transmitting RS to the base station. For instance, the base station may provide to different UEs respective RS configurations (including transmission combs or transmission comb offsets) from a restricted set of valid configurations, so that when the UEs apply their respective RS configurations, the resulting received signal at the base station may satisfy the identity property.

FIGS. 9A-9C illustrate examples 900, 920, 940 of a multiplexed signal including RSs from different UEs according to different RS configurations. In particular, FIG. 9A illustrates an example of an invalid RS configuration where the received signal does not occupy inconsecutive subcarriers or resource elements as a result of the multiplexing, while FIGS. 9B and 9C illustrate examples of valid RS configurations where the received signal occupies inconsecutive subcarriers or resource elements after the multiplexing. The examples of FIGS. 9A-9C are not intended to be exhaustive; other invalid RS configurations or valid RS configurations may similarly exist and be considered.

In the invalid configuration example of FIG. 9A, two UEs transmit respective RSs with a comb-2 pattern and with different transmission comb offsets (offsets 0 and 1). Thus, the RS of one UE occupies odd tones while the RS of the other UE occupies even tones. As a result, the received signal at the base station does not follow a comb-2 pattern, and therefore the identity property of Equation 1 will not be found in this received signal. Thus, the base station may refrain from including this configuration in the restricted set of valid configurations (or alternatively include this configuration in a set of invalid configurations). In contrast, in the valid configuration example of FIG. 9B, two UEs transmit respective RSs with a comb-2 pattern, a same transmission comb offset (offset 0), and different cyclic shifts. Thus, the received signal at the base station only includes RS at every other tone, allowing the identity property to be satisfied. Similarly, in the valid configuration example of FIG. 9C, if two UEs transmit respective RSs with a comb-4 pattern and with different transmission comb offsets (offsets 0 and 2), the received signal at the base station similarly only includes RS at every other tone, likewise allowing the identity property to be satisfied. Thus, the base station may include these configurations in the restricted set of valid configurations (or alternatively exclude these configurations from a set of invalid configurations).

Generally, when the base station performs analog combining (such as previously described with respect to FIGS. 5-7) of a validly configured RS (such as previously described with respect to FIGS. 9A-9C), the base station adds the RS received via each antenna element in a subarray using a combiner. For instance, in the examples of FIGS. 5-7 where each combiner is a 4:1 combiner, the base station may apply the following formula given by Equation 2 for each subarray or group of 4 antenna elements to result in a combined signal:

$$y_j(t) = \Sigma_{l=4j}^{l=4j+3} a_l x_l(t) \text{ for } j=0:\text{numTxRU}-1 \quad (2)$$

where y is the combined signal received by a jth TxRU at time t, numTxRU is the number of TxRUs (or combiners or subarrays), a is the analog weight for a given antenna element l, and x is the received signal at time t via antenna element l. However, as previously described with respect to FIGS. 6 and 7, this analog combining at each TxRU may result in inefficient channel sounding and estimation in the event the baseband modem supports less TxRUs than those of the RxFE.

Therefore, to reduce the number of RS transmissions and thereby improve this efficiency, the base station may incorporate the aforementioned identity property of Equation 1 when performing analog combining to increase the number of antenna elements considered in a single combination. For instance, instead of merely applying a 4:1 combiner to combine the signal received via each group of 4 antenna elements during a symbol, the base station may apply an 8:1 combiner to combine the signal received via two groups of 4 antenna elements using a different set of analog weights or coefficients ($a_l$) respectively during the first half and the second half of the symbol. As an example, during the first half of the symbol, the base station may apply the formula given by Equation 3 below to combine both groups of 4 antenna elements using one set of analog weights (including eight coefficients, one for each antenna element added using the 8:1 combiner), while during the second half of the symbol, the base station may apply the formula given by Equation 4 below to combine both groups of 4 antenna elements using a different set of analog weights (similarly including eight coefficients). At least one of the analog weights in one set may be different than a corresponding weight in the other set. For example, the base station may configure the phases of each analog weight corresponding to one of the groups of 4 antenna elements to change (e.g., shift by a value of $\pi$ to result in a flip from positive to negative or vice-versa) between the first half of the symbol and the second half of the symbol. This example is illustrated by the differences between the set of analog weights ($\alpha$) referenced in Equation 3 for the first half symbol and the set of analog weights ($\beta$) referenced in Equation 4 for the second half symbol:

$$y_j(t) = \Sigma_{l=8j}^{l=8j+7} a_l x_l(t),\ 0 \leq t < T/2 \quad (3)$$

$$y_j(t) = \Sigma_{l=8j}^{l=8j+7} \beta_l x_l(t),\ T/2 \leq t < T \quad (4)$$

where y is the combined signal received by a jth TxRU at time t, a and $\beta$ are analog weights for a given antenna element l, x is the received signal at time t via antenna element l, T is the duration of a symbol, and $\beta_{8j:8j+7} = [a_{8j}, a_{8j+1}, a_{8j+2}, a_{8j+3}, -a_{8j+4}, -a_{8j+5}, -a_{8j+6}, -a_{8j+7}]$.

After combining the signals such as in accordance with Equations 3 and 4 above, the base station may recover each of the combined signals output from the 8:1 combiners for channel estimation. For example, the base station may aggregate the two 8:1 combinations using the summation function given by Equation 5 below to recover the analog combined signal for one of the groups of 4 antenna elements, and the base station may aggregate the two 8:1 combinations using another summation function (e.g., a negative summation or subtraction) given by Equation 6 below to recover the analog combined signal for the other one of the groups of 4 antenna elements:

$$y_j(t) + y_j\left(t + \frac{T}{2}\right) = \Sigma_{l=8j}^{l=8j+7} a_l x_l(t) + \Sigma_{l=8j}^{l=8j+7} \beta_l x_l(t+T) \quad (5)$$

$$\approx 2\Sigma_{l=8j}^{l=8j+3} a_l x_l(t) \text{ for } 0 \leq t < \frac{T}{2}$$

$$y_j(t) - y_j\left(t + \frac{T}{2}\right) = \Sigma_{l=8j}^{l=8j+7} a_l x_l(t) - \Sigma_{l=8j}^{l=8j+7} \beta_l x_l(t+T) \quad (6)$$

$$\approx 2\Sigma_{l=8j+4}^{l=8j+7} a_l x_l(t) \text{ for } 0 \leq t < \frac{T}{2}$$

where y is the combined signal received by a jth TxRU at time t, a and $\beta$ are analog weights for a given antenna element l, x is the received signal at time t via antenna element l, T is the duration of a symbol, and $\beta_{8j:8j+7} = [a_{8j}, a_{8j+1}, a_{8j+2}, a_{8j+3}, -a_{8j+4}, -a_{8j+5}, -a_{8j+6}, -a_{8j+7}]$.

Figure 10:
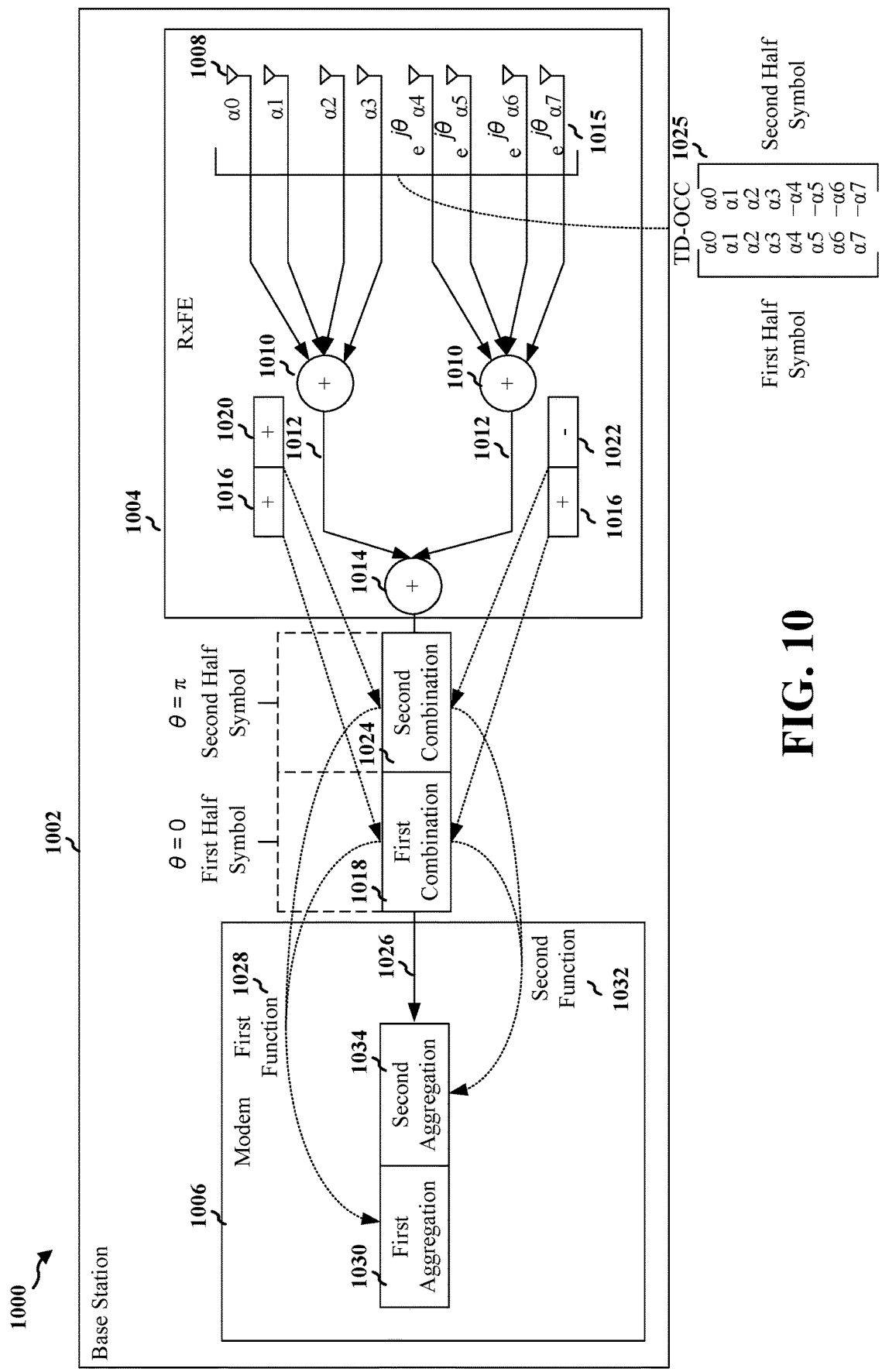
FIG. 10 is a diagram illustrating an example of a base station including an RxFe and a baseband modem which supports less RF chains at a given time than that of the RxFE similar to the base station of FIG. 6, but which applies efficient analog combining notwithstanding this modem limitation using the aforementioned identity property illustrated in FIGS. 8A-8D.

FIG. 10 illustrates an example 1000 of a base station 1002 including an RxFE 1004 and a baseband modem 1006 which supports less RF chains at a given time than those of the RxFE (similar to the baseband modem and RxFE in FIG. 6), but which applies efficient analog combining notwithstanding this modem limitation using the aforementioned identity property of Equation 1. The RxFE 1004 may include a plurality of antenna elements 1008 in subarrays of one or more antenna panels, and a plurality of combiners 1010 which respectively add together a signal received via each of the antenna elements in a given subarray and output a combined signal via a TxRU 1012. The combiners in this example are 4:1 combiners similar to the combiners in FIG. 6, although the combiners may be different in other examples. Moreover, although the example of FIG. 10 only illustrates two 4:1 combiners for convenience of illustration and description, it should be understood that the RxFE may include more than two combiners and that the following description may similarly apply to these additional combiners of the RxFE.

In the illustrated example of FIG. 10, two subarrays or groups of 4 antenna elements are further combined together using combiner 1014 (e.g., an 8:1 combiner) during different halves of a symbol based on analog weights 1015 associated with each antenna element. Here, the top group of antenna elements are associated with analog weights $a_0, a_1, a_2, a_3$, while the bottom group of antenna elements are associated with analog weights $e^{j\theta}a_4, e^{j\theta}a_5, e^{j\theta}a_6, e^{j\theta}a_7$. During the first half of the symbol, $\theta$ initially equals 0, so the first set of analog weights to be applied is $[a_0, a_1, a_2, a_3, a_4, a_5, a_6, a_7]$. Thus, since the analog weights associated with the top and bottom groups of antenna elements both include a positive phase 1016, the received signal via the top group of antenna elements and the received signal via the bottom group of antenna elements are added together according to Equation 3 to result in a first combination 1018. During the second half of the symbol, $\theta$ is changed to equal $\pi$, resulting in a phase flip for the bottom group of antenna elements, and the second set of analog weights to be applied is thus $[a_0, a_1, a_2, a_3, -a_4, -a_5, -a_6, -a_7]$. Thus, since the analog weights associated with the top and bottom groups of antenna elements include a positive phase 1020 and negative phase 1022 respectively, the received signal via the bottom group of antenna elements is subtracted from the received signal via the top group of antenna elements according to Equation 4 to result in a second combination 1024.

The two different sets of analog weights 1015 may be elements of a time domain orthogonal cover code (TD-OCC) 1025 which the base station may apply to the received signal via each of the antenna elements 1008 at different times during a symbol. For example, the baseband modem or RxFE may configure a TD-OCC including different OCC vectors or columns, where one OCC vector indicates the first set of analog weights for the RxFE to apply to the phase shifters of the respective antenna elements during the first half of the symbol, and another OCC vector indicates the second set of analog weights for the RxFe to apply to the phase shifters of the respective antenna elements during the second half of the symbol. Thus, during the first half of the symbol, the RxFE may apply the first OCC vector $[a_0, a_1, a_2, a_3, a_4, a_5, a_6, a_7]$ to the signals received via the respective antenna elements and combine the signals according to Equation 3 to result in first combination 1018, and during the second half of the symbol, the RxFE may apply the second OCC vector $[a_0, a_1, a_2, a_3, -a_4, -a_5, -a_6, -a_7]$ to the signals received via the respective antenna elements and combine the signals according to Equation 4 to result in second combination 1024.

After obtaining the combinations, the RxFE may provide the combined signal over a baseband TxRU 1026 to the baseband modem. The baseband modem may then recover the channels over each of the TxRUs 1012 by aggregating the received combinations using different functions equal in quantity to an amount of the TxRUs 1012. For instance, to recover the channel for the top group of antenna elements, the baseband modem may add together the first combination 1018 and second combination 1024 according to a first function 1028 given by Equation 5 to obtain first aggregation 1030. The baseband modem may then perform channel estimation on this top channel using the first aggregation 1030. Moreover, to recover the channel for the bottom group of antenna elements, the baseband modem may subtract the second combination 1024 from the first combination 1018 according to a second function 1032 given by Equation 6 to obtain second aggregation 1034. The baseband modem may similarly perform channel estimation on this bottom channel using the second aggregation 1034.

Thus, even in cases where the number of TxRUs the baseband modem can support is less than the number of TxRUs of the RxFE, by applying the aforementioned functions or similar equations, the base station 1002 may recover multiple combined channels associated with a single received RS during a symbol via different groups of antenna elements. For instance, in the example of FIG. 10, the baseband modem may apply Equations 1, 3, 4, 5, and 6 to recover two combined channels (corresponding to the TxRUs 1012), notwithstanding only having one interface associated with these channels with the RxFE via baseband TxRU 1026. As a result, the base station may effectively double its number of supported TxRUs for channel estimation as a result of analog combining using the identity property of the RS. Moreover, the base station may estimate these respective TxRU channels (corresponding to TxRUs 1012) in response to the change in analog weights from one half symbol to the next half symbol, since the change in weight allows for different combinations to be applied at different times (e.g., according to Equations 3 and 4) and differently aggregated (e.g., according to Equations 5 and 6) to result in recovery of the combined channels of each antenna element subarray.

Figure 11:
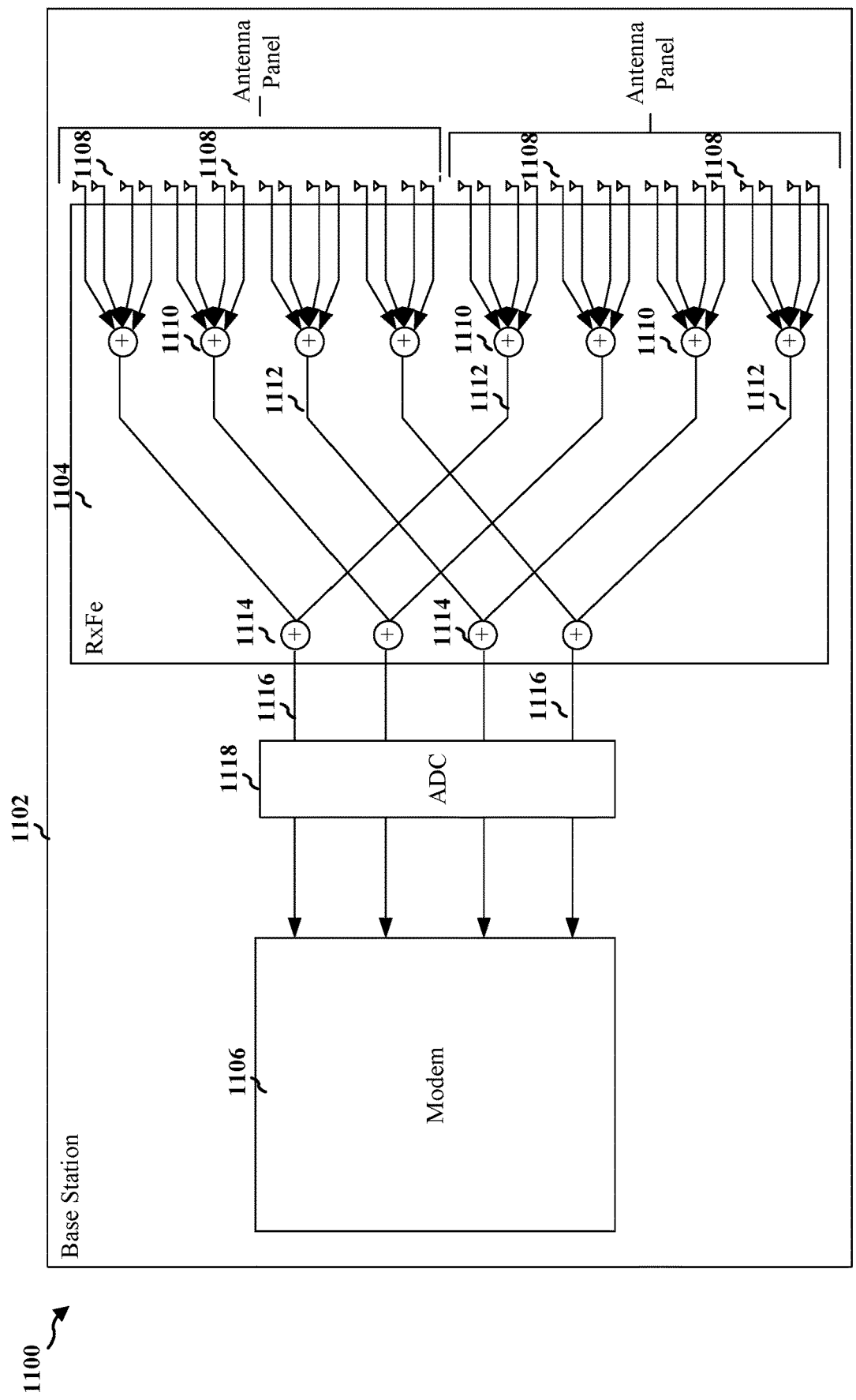
FIG. 11 is a diagram illustrating an example of a base station including an RxFe and a baseband modem which may estimate multiple combined channels associated with a single received RS during a symbol via different groups of antenna elements as a result of the aforementioned identity property.

FIG. 11 illustrates an example 1100 of a base station 1102 including an RxFE 1104 and a baseband modem 1106 which may estimate multiple combined channels associated with a single received RS during a symbol via different groups of antenna elements in response to the efficient analog combining of FIG. 10. The RxFE 1104 may include a plurality of antenna elements 1108 in subarrays of one or more antenna panels, and a plurality of combiners 1110 which each add together a signal received via each of the antenna elements in a given subarray and output a combined signal via a TxRU 1112. Moreover, the RxFE 1104 may include combiners 1114 which further combine each pair of two subarrays or groups of 4 antenna elements together during different halves of a symbol based on analog weights associated with each antenna element. Although the combiners 1110 in this example are 4:1 combiners similar to the combiners in FIG. 6 and the combiners 1114 are 8:1 combiners similar to the combiner 1014 in FIG. 10, the combiners and additional combiners may be different in other examples.

Each of the combiners 1114 in the RxFE may apply the identity property of Equation 1 and the analog combining given by Equations 3-6 for a respective pair of antenna element subarrays (where at least one analog weight changes between the first half of a symbol and a second half of a symbol). The resulting combinations from each of the combiners 1114 may respectively be output to the baseband modem over respective baseband TxRUs 1116. After this output is converted from the analog domain to the digital domain using an ADC 1118, the baseband modem may aggregate the combinations respectively received over each baseband TxRU 1116 in order to recover the channels of each corresponding pair of TxRUs 1112. As a result, the baseband modem may recover and estimate the channels over each of the TxRUs 1112 of the RxFE 1104 from a single RS (rather than in response to multiple RSs as in the example of FIG. 7), thereby improving UE energy efficiency, efficient resource allocation, and coherency between the antenna elements.

As a result, by applying the aforementioned analog combining technique, the base station may recover and estimate the combined channels for groups of antenna elements (e.g., channels respectively corresponding to an individual TxRU such as TxRU 1112). However, in some scenarios, it may be helpful for the base station to recover and estimate the channels for individual antenna elements (e.g., a channel corresponding to a respective one of the antenna elements 1108). For instance, in certain mmW frequency bands or when performing hybrid (analog/digital) beamforming, the base station may intend to communicate data to one UE via one of the antenna elements in a group or subarray and simultaneously communicate data to another UE via another one of the antenna elements in the same group or subarray. Thus, it would be helpful for the base station to be able to ascertain the channel associated with each individual antenna element when performing analog combining (e.g., to assist the base station in serving multiple UEs at the same time).

To this end, the base station may leverage the phase shifter associated with each individual antenna element by changing the respective analog weights according to a different TD-OCC. This process similarly applies an identity property such as used in the analog combining technique described with respect to FIGS. 10 and 11, but instead of applying two different sets of analog weights respectively for different half symbols, the base station may apply various different sets of analog weights at least equivalent in number to the quantity N of antenna elements combined in a given subarray or group. For example, to recover the individual channels for each antenna element associated with a 4:1 combiner (which combines the signal received via N=four antenna elements), the base station may apply four different sets of analog weights respectively for different quarter symbols. Similarly, to recover the individual channels for each antenna element associated with a N:1 combiner (which combines the signal received via N antenna elements), the base station may apply N different sets of analog weights respectively for N symbol portions. Each analog weight may be an element of the TD-OCC similar to the examples of FIGS. 10 and 11, but the dimensions of the TD-OCC may be different in this example to accommodate the quantity N of antenna elements in a given group or subarray.

As a result, the base station may recover and estimate the individual channels over each of the antenna elements of any given subarray or combined group of antenna elements in the RxFE. For instance, in a similar manner to that described with respect to FIGS. 10 and 11, the N different changes in analog weights may allow for N different combinations to be applied at different times (e.g., similar to Equations 3 and 4) and N different aggregations to be applied (e.g., similar to Equations 5 and 6) to result in recovery and subsequent estimation of the individual channels of each antenna element in a given subarray. This technique may be applied in cases where the number of TxRUs the baseband modem supports is less than the number of TxRUs of the RxFE (such as illustrated in FIG. 11) and thus may result in individual channel recovery and estimation from a single RS with similar improvements to UE energy efficiency, efficient resource allocation, and coherency between the antenna elements. Alternatively, this technique may be applied in cases where the number of TxRUs the baseband modem supports is at least equal to the number of TxRUs of the RxFE (such as illustrated in FIG. 5), and thus may also result in individual channel recovery and estimation from either a single RS or from multiple RSs. For instance, in the case of multiple RSs, rather than applying N different sets of analog weights respectively for N symbols portions to recover the individual channels for each antenna element associated with a N:1 combiner, the base station may apply N different sets of analog weights respectively for N different symbols.

Figure 12:
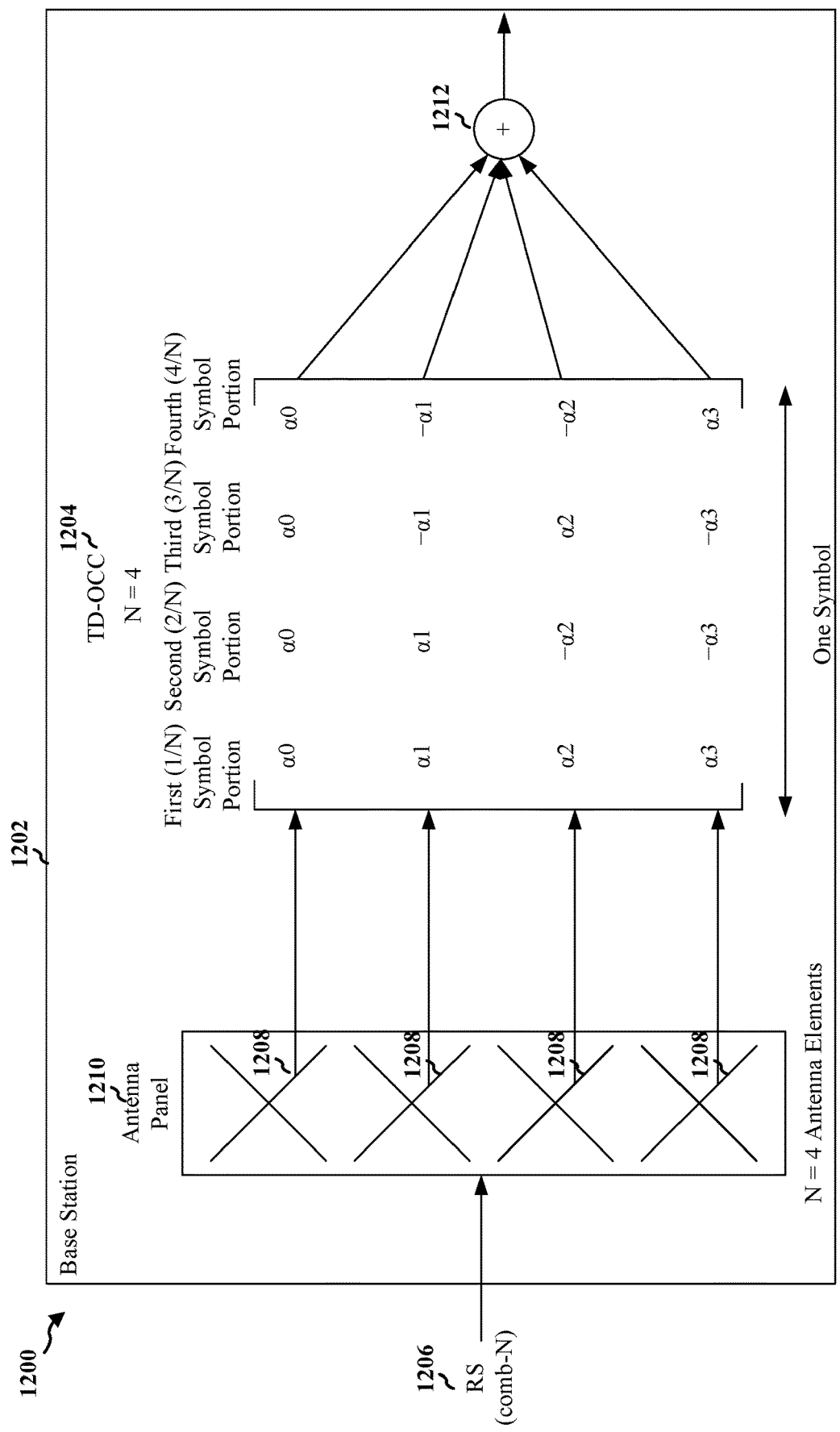
FIG. 12 is a diagram illustrating an example of a base station which applies a time domain orthogonal cover code (TD-OCC) when combining an RS received via a plurality of antenna elements of an antenna panel during a single symbol.

FIG. 12 illustrates an example 1200 of a base station 1202 which applies a TD-OCC 1204 when combining an RS 1206 received via a plurality of antenna elements 1208 of an antenna panel 1210 during a single symbol. In this example, the base station includes a combiner 1212 which combines signals received via N=4 antenna elements (e.g., the combiner is a 4:1 combiner, where N=4). In order to recover and estimate the individual channel of each antenna element, the base station configures the RS to satisfy an identity property similar to that of Equation 1, but where the received signal in each of N symbol portions (rather than in each half of a symbol) is approximately the same. As previously described with respect to FIGS. 8A-8D, an RS having a comb-2 pattern may be approximately identical in at least two half symbols, while an RS having a comb-4 pattern may be approximately identical in at least four quarter symbols. Stated more generally, an RS having a comb-N pattern may be approximately identical in at least N symbol portions. Based on this identity property, the base station may estimate the individual channel of each antenna element if the received signal has a transmission comb pattern equal to or larger than the quantity of antenna elements being combined by combiner 1212 (in this case, N=4 antenna elements). Thus, in the example of FIG. 12 where N=4, the base station may configure the UE to transmit a RS with at least a comb-N=4 transmission pattern in order to satisfy this identity property and allow for recovery of the individual antenna channels. Another example for the combining weight is based on the DFT matrix instead of the TD-OCC. An example of a DFT-matrix may be given by:

$+\alpha_0 \; +\alpha_0 \; +\alpha_0 \; +\alpha_0$
$+\alpha_1 \; -\alpha_1 j \; -\alpha_1 \; +\alpha_1 j$
$+\alpha_2 \; -\alpha_2 \; +\alpha_2 \; -\alpha_2$
$+\alpha_3 \; +\alpha_3 j \; -\alpha_3 \; -j\alpha_3$ In some cases, the base station may receive an RS respectively from multiple UEs in a multiplexed received signal. If the multiplexed RSs result in a received signal that does not include the comb-N transmission pattern, the RS configuration may be invalid for individual channel recovery and estimation (similar to the invalid configuration of FIG. 9A). To prevent such invalid configurations, the base station may restrict the RS configurations so that a multiplexed received signal still includes the comb-N transmission pattern (similar to the valid configurations of FIGS. 9B and 9C). For example, the base station may allocate the RS ports such that the UEs are configured to transmit an RS with a same transmission comb pattern and a same transmission comb offset but with different cyclic shifts (similar to the example of FIG. 9B), or to respectively transmit RS with a same transmission comb pattern but different transmission comb offsets (similar to the example of FIG. 9C). Thus, in the example of FIG. 12 where N=4, to ensure a received signal multiplexing RS from two UEs maintains a comb-4 pattern, the base station may restrict the RS configurations such that two UEs each transmit RS with a comb-4 pattern with offset 0 and different cyclic shifts, or such that each UE transmits RS with a comb-8 pattern with offsets 0 and 4 respectively.

In response to receiving the RS 1206 via the N antenna elements, the base station may configure and apply an N×N matrix of orthogonal weights (an N TD-OCC), including N different sets of analog weights to be applied in N different portions of a symbol. The N TD-OCC may be an intra-polarization spatial TD-OCC such as a Walsh code or other orthogonal code which the base station may apply to the phase shifters of respective antenna elements in respective symbol portions during analog combining. For instance, in the example of FIG. 12 where N=4, the base station may configure and apply a 4 TD-OCC including 4 rows which the base station respectively applies to each antenna element and 4 OCC vectors or columns which the base station respectively applies in each quarter symbol. For example, referring to FIG. 12, the base station may apply a first set of analog weights [$a_0, a_1, a_2, a_3$] (the first OCC vector) respectively to the four antenna elements during the first quarter symbol, a second set of analog weights [$a_0, a_1, -a_2, -a_3$] (the second OCC vector) respectively to the antenna elements during the second quarter symbol, a third set of analog weights [$a_0, -a_1, a_2, -a_3$] respectively to the antenna elements during the third quarter symbol, and a fourth set of analog weights [$a_0, -a_1, -a_2, a_3$] respectively to the antenna elements during the fourth quarter symbol. Thus, at least one of these analog weights or TD-OCC elements may change over time (e.g., between one symbol portion and the next) to form different analog weight sets. These different sets may be configured, for example, in response to different cyclic shifts in each symbol portion. For example, the 4×4 TD-OCC illustrated in FIG. 12 may be derived from the following cyclic-shift based matrix (DFT-based matrix)

$$\begin{bmatrix} +1 & +1 & +1 & +1 \\ +1 & +j & -1 & -j \\ +1 & -1 & +1 & -1 \\ +1 & -j & -1 & +j \end{bmatrix}$$

Thus, based on the TD-OCC, the base station may apply a different set of analog weights to respective antenna elements in each quarter of a symbol. As a result, the base station may recover the individual channel for each antenna element using combinations and aggregations similar to those described previously with respect to the examples of FIGS. 10 and 11 (e.g., first combination 1018, second combination 1024, first aggregation 1030, second aggregation 1034). For instance, for each symbol portion n of N symbol portions, where $1 \leq n \leq N$, the base station or RxFE may combine the received signal via each of N antenna elements using an nth OCC vector to arrive at an nth combination. Then, after obtaining N combinations in this manner, for each value of n, the base station or baseband modem may aggregate the N combinations using an nth function to arrive at an nth aggregation, where $1 \leq n \leq N$. Next, after obtaining N aggregations in this manner, the base station or baseband modem may recover the individual channels of all N antenna elements, and perform channel estimation on the recovered channels accordingly. For example, referring to FIG. 12, the combiner 1212 may add the received signal via each of the 4 antenna elements modified according to the first OCC vector during the first quarter symbol to form a first combination, the combiner may add the received signal via each of the antenna elements modified according to the second OCC vector during the second quarter symbol to form a second combination, and so forth to form four different combinations. Afterwards, the base station may aggregate the four combinations according to a first function to form a first aggregation, then aggregate the four combinations according to a second function to form a second aggregation, and so forth to form four different aggregations. The base station may then recover the individual channels associated with the four antenna elements respectively based on the four different aggregations, and subsequently perform channel estimation on the recovered channels.

Figure 13:
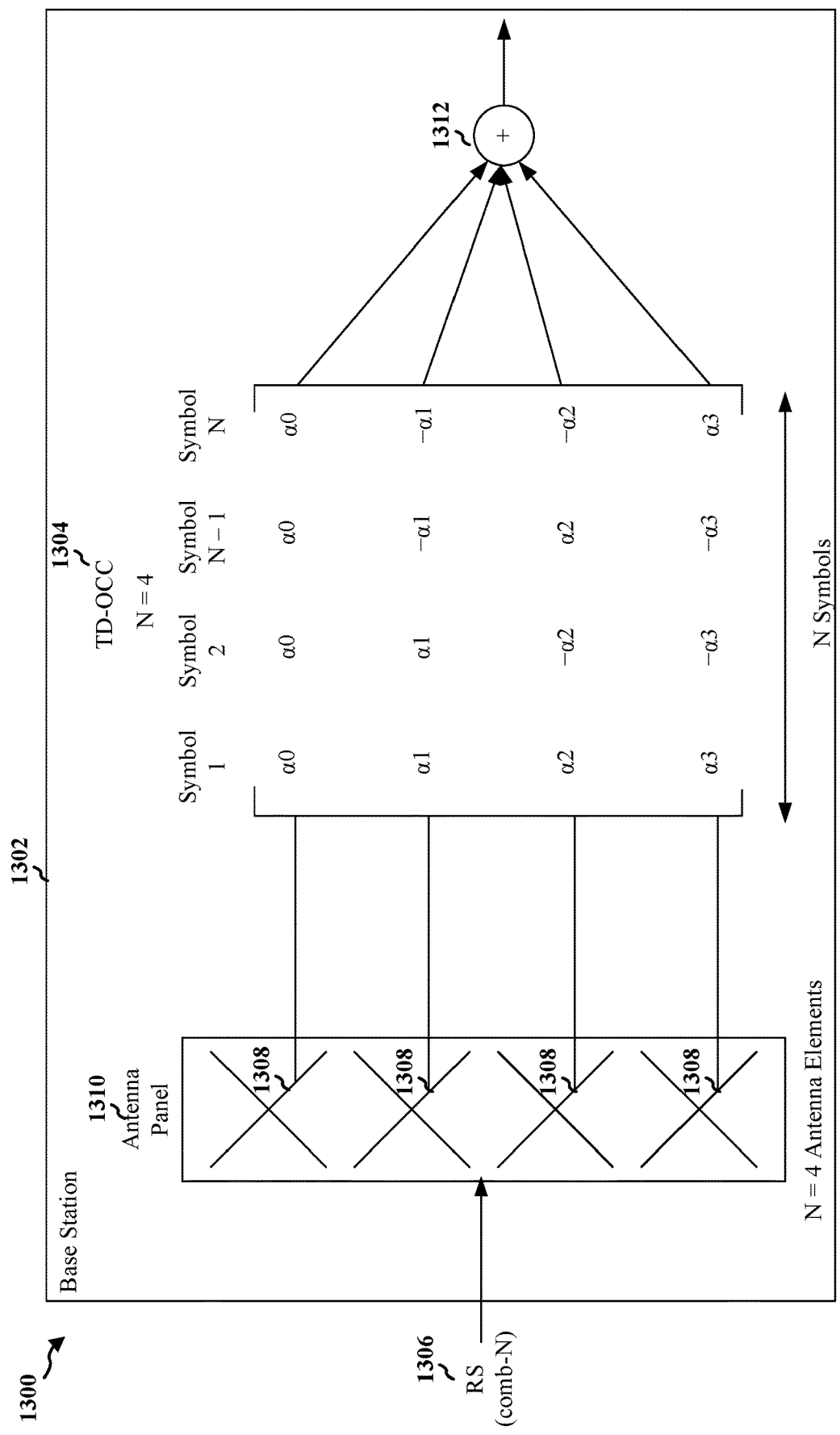
FIG. 13 is a diagram illustrating an example of a base station which applies a TD-OCC when combining RSs received via a plurality of antenna elements of an antenna panel during multiple respective symbols.

FIG. 13 illustrates an example 1300 of a base station 1302 which applies a TD-OCC 1304 when combining RSs 1306 received via a plurality of antenna elements 1308 of an antenna panel 1310 during multiple respective symbols. In this example, the base station includes a combiner 1312 which combines signals received via N=4 antenna elements (e.g., the combiner is a 4:1 combiner, where N=4). Here, unlike the previous example of FIG. 12, a RS is received in each one of N symbols (e.g., 4 different symbols in this example). Therefore, the base station may recover and estimate the individual channel of each antenna element without configuring the RSs to satisfy a per-symbol identity property. Thus, the base station may avoid restricting the transmission comb pattern or transmission comb offset or RS port allocation of any RS in this example (e.g., there is no invalid configuration in this example).

In response to receiving the RS 1306 via the N antenna elements, the base station may configure and apply a N×N TD-OCC, including N different sets of analog weights to be applied respectively in N different symbols. The TD-OCC may be an inter-polarization spatial TD-OCC such as a Walsh code or other orthogonal code which the base station may apply to the phase shifters of respective antenna elements in respective symbols during analog combining. For instance, in the example of FIG. 13 where N=4, the base station may configure and apply a 4×4 TD-OCC including 4 rows which the base station respectively applies to each antenna element and 4 OCC vectors or columns which the base station respectively applies in each symbol. For example, referring to FIG. 13, the base station may apply a first set of analog weights [$a_0$, $a_1$, $a_2$, $a_3$] (the first OCC vector) respectively to the four antenna elements during the first symbol, a second set of analog weights [$a_0$, $a_1$, $-a_2$, $-a_3$] (the second OCC vector) respectively to the antenna elements during the second symbol, a third set of analog weights [$a_0$, $-a_1$, $a_2$, $-a_3$] respectively to the antenna elements during the third symbol, and a fourth set of analog weights [$a_0$, $-a_1$, $-a_2$, $a_3$] respectively to the antenna elements during the fourth symbol. Thus, at least one of these analog weights or TD-OCC elements may change over time (e.g., between one symbol and the next) to form different analog weight sets.

Thus, based on the TD-OCC, the base station may apply a different set of analog weights to respective antenna elements in each symbol. Moreover, the base station may recover the individual channel for each antenna element using combinations and aggregations similar to those described previously with respect to the examples of FIGS. 10 and 11 (e.g., first combination 1018, second combination 1024, first aggregation 1030, second aggregation 1034), but with respect to symbols rather than symbol portions. For instance, for each symbol n of N symbols, where $1 \leq n \leq N$, the base station or RxFE may combine the received signal via each of N antenna elements using an nth OCC vector to arrive at an nth combination. Then, after obtaining N combinations in this manner, for each value of n, the base station or baseband modem may aggregate the N combinations using an nth function to arrive at an nth aggregation, where $1 \leq n \leq N$. Next, after obtaining N aggregations in this manner, the base station or baseband modem may recover the individual channels of all N antenna elements, and perform channel estimation on the recovered channels accordingly. For example, referring to FIG. 13, the combiner 1312 may add the received signal via each of the 4 antenna elements modified according to the first OCC vector during the first symbol to form a first combination, the combiner may add the received signal via each of the antenna elements modified according to the second OCC vector during the second symbol to form a second combination, and so forth to form four different combinations. Afterwards, the base station may aggregate the four combinations according to a first function to form a first aggregation, then aggregate the four combinations according to a second function to form a second aggregation, and so forth to form four different aggregations. The base station may then recover the individual channels associated with the four antenna elements respectively based on the four different aggregations, and subsequently perform channel estimation on the recovered channels.

Thus, in response to changing at least one analog weight over time according to a TD-OCC, the base station may recover a combined channel associated with a group or subarray of antenna elements or an individual channel associated with an antenna element in the group or subarray. For instance, in the examples of FIGS. 10-13, the base station may adjust one or more phase shifters in a group of antenna elements by changing the analog weight(s) between one symbol portion or symbol and the next to arrive at various combinations and aggregations, which may allow the base station to recover a combined channel over the TxRU associated with that group of antenna elements (if the weight changes within a symbol) or an individual channel associated with one of the antenna elements in the group. However, each of these analog weights do not change instantly but rather after a transition time (e.g., after 300 ns), and thus the base station may not process any RS samples for channel recovery and estimation during this transition time. The sharp transitions due to switching delays may cause spurious behavior and bandwidth expansion. Pulse shaping techniques such as WOLA (window overlap and add) or time-domain roll-off filtering at the switching transition can be considered to overcome any discontinuity in the waveform due to time switching. In the cases where an analog weight is changed during a symbol (as in the examples of FIGS. 10-12, but not in the example of FIG. 13), the transition time may occur during a part of each symbol portion. Thus, in such cases, the base station may discard from its channel recovery and estimation process any samples of RS obtained during the transition time(s).

Figure 14:
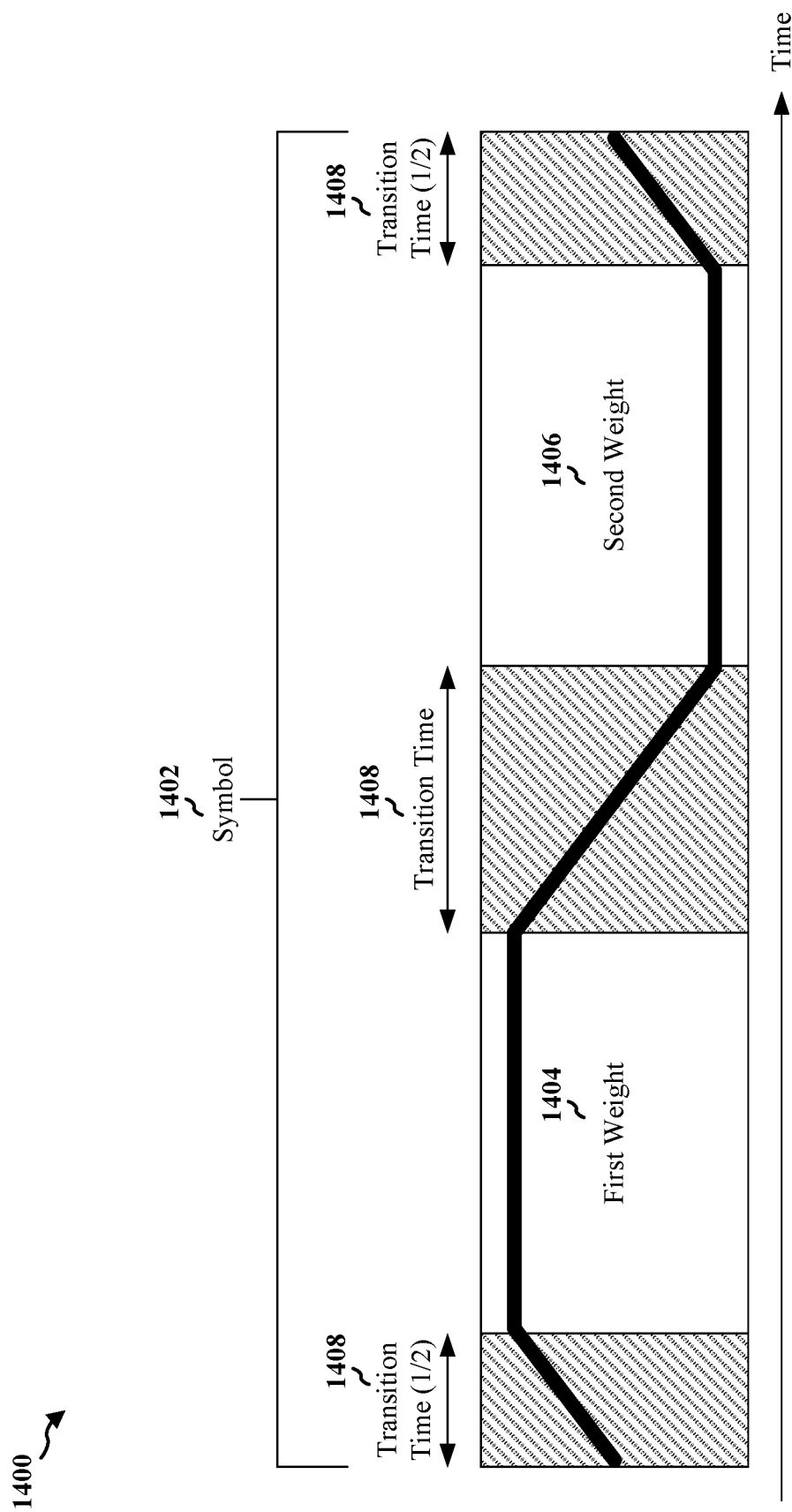
FIG. 14 is a diagram illustrating an example of a symbol during which the base station may change an analog weight between a first weight and a second weight over a transition time.

FIG. 14 illustrates an example 1400 of a symbol 1402 during which the base station may change an analog weight between a first weight 1404 and a second weight 1406 over a transition time 1408. For instance, referring to the example of FIG. 10, the base station may adjust any of the analog weights $a_4$, $a_5$, $a_6$, $a_7$ from a positive phase (corresponding to first weight 1404) in a first half symbol (where $\theta=0$) to a negative phase (corresponding to second weight 1406) in a second half symbol (where $\theta=\pi$). Similarly, referring to the example of FIG. 12, the base station may adjust any of the analog weights $a_1$, $a_2$, $a_3$ from one phase (corresponding to first weight 1404) in one quarter symbol to another phase (corresponding to second weight 1406) in another quarter symbol, and then back to the previous phase (corresponding again to the first weight 1404) in a further quarter symbol. Thus, the symbol 1402 may include transition times 1408 over which the first weight 1404 may change to the second weight 1406 and vice-versa.

During these transition times 1408, the base station or baseband modem may discard any signal received via the antenna elements due to the instability of the analog weights. As a result, discarded signal samples may not be combined. For instance, referring to FIG. 10, the base station may apply a modified version of Equations 3 and 4 to account for the discarded transition times when arriving at the first combination 1018 and second combination 1024 respectively. For example, the base station may apply Equations 7 and 8 below during the first half symbol and the second half symbol, respectively:

$$y_j(t) = \sum_{l=8j}^{l=8j+7} a_l x_l(t), \frac{d}{2} \leq t < \frac{T-d}{2} \quad (7)$$

$$y_j(t) = \sum_{l=8j}^{l=8j+7} \beta_l x_l(t), \frac{T+d}{2} \leq t < T - \frac{d}{2} \quad (8)$$

where d a transition time of each analog weight, y is the combined signal received by a jth TxRU at time t, a and $\beta$ are analog weights for a given antenna element l, x is the received signal at time t via antenna element l, T is the duration of a symbol, and $\beta_{8j:8j+7}=[a_{8j}, a_{8j+1}, a_{8j+2}, a_{8j+3}, -a_{8j+4}, -a_{8j+5}, -a_{8j+6}, -a_{8j+7}]$.

For instance, if the transition time d=300 ns, then the first combination 1018 may be the result of Equation (9) while the second combination 1024 may be the result of Equation (10), below:

$$w = z_0\left(150: \frac{T}{2} - 150\right) + z_0\left(\frac{T}{2} + 150: T - 150\right) + \quad (9)$$
$$z_1\left(150: \frac{T}{2} - 150\right) + z_1\left(\frac{T}{2} + 150: T - 150\right)$$

$$v = z_0\left(150: \frac{T}{2} - 150\right) + z_0\left(\frac{T}{2} + 150: T - 150\right) - \quad (10)$$
$$z_1\left(150: \frac{T}{2} - 150\right) - z_1\left(\frac{T}{2} + 150: T - 150\right)$$

where w is the first combination, v is the second combination, T is the duration of a symbol, $z_0(t)=\Sigma_{l=0}^{l=3} a_l x_l(t)$, $z_1(t)=\Sigma_{l=4}^{l=7} a_l x_l(t)$, a is an analog weight for a given antenna element l, and x is the received signal at time t via antenna element l.

Figure 15:
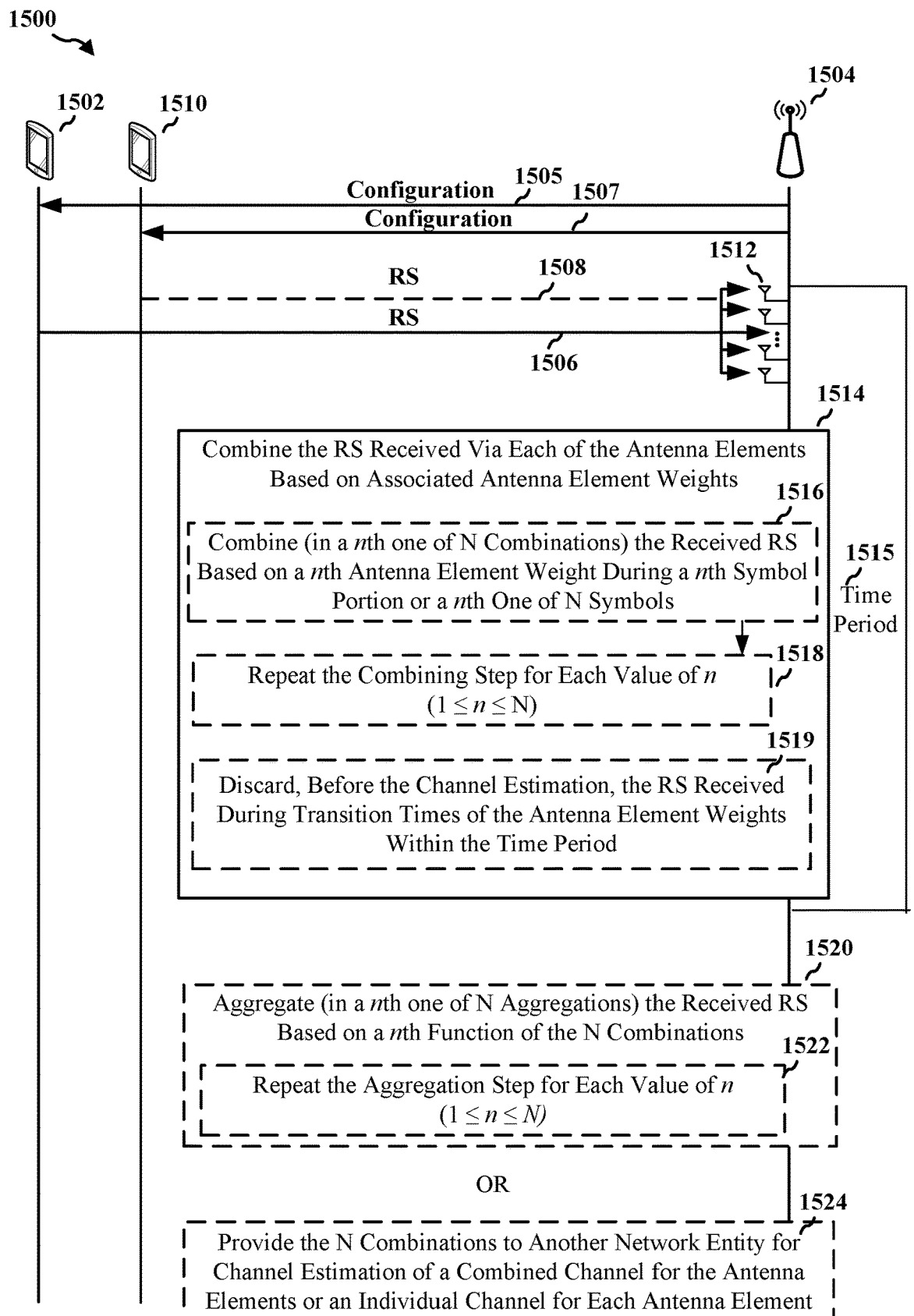
FIG. 15 is a diagram illustrating an example of a call flow between a UE and a base station.

FIG. 15 illustrates an example 1500 of a call flow between a UE 1502 and a base station 1504. Initially, the base station 1504 or a component of the base station (e.g., the RxFE) may transmit, to UE 1502, a configuration 1505 for an RS 1506 from the UE 1502. The RS 1506 may be, for example, an SRS, a RACH preamble or other message, or a DMRS. The base station may also transmit configurations to other UEs for other RSs. For instance, the base station may transmit a configuration 1507 for another RS 1508 (e.g., SRS, RACH, DMRS) from another UE 1510. The configuration(s) 1505, 1507 may indicate a restricted set of valid RS configurations for analog combining. For instance, the configuration(s) may indicate a transmission comb number or pattern, a comb offset, a cyclic shift, or an RS port allocation which the UE(s) are to apply to their RS(s) to prevent the base station from receiving a multiplexed signal with an invalid configuration such as illustrated in FIG. 9A (e.g., where the RSs are received in consecutive subcarriers). For example, the configuration(s) 1505, 1507 may indicate transmission comb numbers, cyclic shifts, or comb offsets from any of the valid configurations of FIGS. 9B and 9C, or from any other such configuration which results in the received RS from the UE(s) having a comb-N pattern (where N≥2) which satisfies an identity property applied by the base station in its analog combining.

Subsequently, the base station 1504 or a component of the base station (e.g., the RxFE) may receive an RS 1506 from the UE 1502. The RS 1506 may be multiplexed with another RS 1508 from another UE 1510. The base station or a component of the base station (e.g., the RxFE) may receive the RS 1506 (and RS 1508) via a plurality of antenna elements 1512. For example, referring to the aforementioned Figures, the base station 102/180, 310, 502, 602, 702, 1002, 1102, 1202, 1302, the RX processor 370, the RU 440, or the RxFE 504, 604, 704, 1004, 708, 1008, 1108, 1208, 1308.

After receiving the RS 1506 (and RS 1508), at block 1514, the base station or a component of the base station (e.g., the RxFE) may combine the RS received via each of the antenna elements based on analog weights associated with the plurality of antenna elements. The reception of the RS and the combination may be performed within a time period 1515, such as a symbol or multiple symbols. For example, referring to the aforementioned Figures, the base station 102/180, 310, 502, 602, 702, 1002, 1102, 1202, 1302, the RX processor 370, the RU 440, or the RxFE 504, 604, 704, 1004, 1104 may apply combiners 512, 612, 712, 1010, 1014, 1110, 1114, 1212, 1312 to add the RS received via antenna elements 320, 508, 608, 708, 1008, 1108, 1208, 1308. Each of the antenna elements may include a phase shifter which is adjusted by an analog weight, such as analog weights 1015 in TD-OCC 1025, 1204, 1304, and the analog weights may be applied respectively to the RS received via each of the antenna elements during a single symbol or multiple symbols. For instance, the RS reception and combination, including the changing of weights, may be applied during a symbol portion (e.g., during each half symbol such as illustrated in FIG. 10 or each quarter symbol such as illustrated in FIG. 12) or during a symbol itself (e.g., each symbol illustrated in FIG. 13).

In one example, at block 1516, the base station or a component of the base station (e.g., the RxFE) may combine (in a nth one of N combinations) the received RS 1506, 1508 based on a nth antenna element weight during an nth symbol portion of N symbol portions or during an nth one of N Symbols. Moreover, at block 1518, the base station or a component of the base station (e.g., the RxFE) may repeat the combining step of block 1518 for each value of n, where 1≤n≤N. For example, referring to the aforementioned Figures, the base station 102/180, 310, 502, 602, 702, 1002, 1102, 1202, 1302, the RX processor 370, the RU 440, or the RxFE 504, 604, 704, 1004, 1104 may apply combiners 512, 612, 712, 1010, 1014, 1110, 1114, 1212, 1312 over n iterations to form N combinations of the RS received via antenna elements 320, 508, 608, 708, 1008, 1108, 1208, 1308, where during each combination, the antenna elements are adjusted by different sets of analog weights such as analog weights 1015 in TD-OCC 1025, 1204, 1304. For instance, in the example of FIG. 10 where N=2, the RxFE 1004 may combine the RS received via antenna elements 1008 using a first set of analog weights during a first half symbol to form first combination 1018 (corresponding to n=1), and the RxFE may repeat this process using a second set of analog weights during a second half symbol to form second combination 1024 (corresponding to n=2). Similarly, in the examples of FIGS. 12 and 13 where N=4, the base station may perform similar additions using different sets of analog weights to arrive at four different combinations of the RS 1206, 1306 over four quarter symbols or symbols respectively.

Additionally, at block 1519, the base station or a component of the base station (e.g., the baseband modem) may discard, before the channel estimation, the RS 1506, 1508 received during transition times of the antenna element weights within the time period 1515. For instance, referring to the aforementioned Figures, the base station 102/180, 310, 502, 602, 702, 1002, 1102, 1202, 1302, the controller/processor 375, the DU 430 or CU 410, or the baseband modem 506, 606, 706, 1006, 1106 may discard certain samples of the RS 1206, 1306 received via antenna elements 320, 508, 608, 708, 1008, 1108, 1208, 1308 when performing the combinations. For example, the baseband modem may discard samples of the RS which are received via those antenna elements that the RxFE has adjusted with changing analog weights over time (e.g., first weight 1404 and second weight 1406 within symbol 1402). The discarded samples include those portions of RS that the RxFE has received during the transition times 1408 of the changing analog weights.

After obtaining the combinations (subject to any discarding), the base station or a component of the base station (e.g., the baseband modem) may aggregate the combinations according to different functions. In one example, at block 1520, the base station or a component of the base station (e.g., the baseband modem) may aggregate (in an nth one of N aggregations) the received RS based on a nth function of the N combinations. Moreover, at block 1522, the base station or a component of the base station (e.g., the baseband modem) may repeat the aggregation step of block 1520 for each value of n, where 1≤n≤N. For example, referring to the aforementioned Figures, the base station 102/180, 310, 502, 602, 702, 1002, 1102, 1202, 1302, the controller/processor 375, the DU 430 or CU 410, or the baseband modem 506, 606, 706, 1006, 1106 may apply different functions of the combinations of RS received via antenna elements 320, 508, 608, 708, 1008, 1108, 1208, 1308 over n iterations to form N aggregations. For instance, in the example of FIG. 10 where N=2, the baseband modem 1006 may apply first function 1028 to the first combination 1018 to form first aggregation 1030 (corresponding to n=1), and the baseband modem may repeat this process applying the second function 1032 to the first combination 1018 and second combination 1024 to form second aggregation 1034 (corresponding to n=2). Similarly, in the examples of FIGS. 12 and 13 where N=4, the base station may perform similar aggregations using different functions of combinations to arrive at four different aggregations of the combinations of RS 1206, 1306.

Alternatively, at block 1524, a component of the base station (e.g., the RxFE) may provide the N combinations obtained at blocks 1516 and 1518 to another network entity (e.g., the baseband modem) for channel estimation of a combined channel for the antenna elements or of an individual channel for each antenna element. In response to the combinations, this other network entity may recover the combined or individual channels associated with the antenna elements 1512 and subsequently perform channel estimation on the recovered channels. For instance, referring to the aforementioned Figures, the RX processor 370, the RU 440, or the RxFE 504, 604, 704, 1004, 1104 of the base station 102/180, 310, 502, 602, 702, 1002, 1102, 1202, 1302 may provide the N combinations to the controller/processor 375, the DU 430 or CU 410, or the baseband modem 506, 606, 706, 1006, 1106 for aggregation according to blocks 1520 and 1522 and subsequent channel recovery and estimation. For instance, in the example of FIG. 10 where N=2, the RxFE 1004 may provide first combination 1018 and second combination 1024 to the baseband modem 1006 over baseband TxRU 1026 for the baseband modem to obtain first aggregation 1030 and second aggregation 1034 and to apply these aggregations to recover and estimate the combined channels over TxRUs 1012. Similarly, in the examples of FIGS. 12 and 13 where N=4, a component of base station 1202 (e.g., a RxFE) may provide the four combinations associated with respective quarter symbols or symbols to another network entity (e.g., a baseband modem) to obtain the N aggregations and to apply these aggregations to recover and estimate the individual channels corresponding to each antenna element 1208, 1308.

FIGS. 16A-16D are a flowchart 1600 of a method of wireless communication. The method may be performed by a network entity (e.g., the base station 102/180, 310, 502, 602, 702, 1002, 1102, 1202, 1302, 1504; the RX processor 370, the controller/processor 375; the RU 440, the DU 430, the CU 410; the RxFE 504, 604, 704, 1004, 1104; the baseband modem 506, 606, 706, 1006, 1106; the apparatus 1802). Optional aspects are illustrated in dashed lines. The method allows a base station to perform analog combining of an RS received via a plurality of antenna elements using at least one time-varying analog weight in a TD-OCC or DFT matrix, in order to recover a combined channel associated with a group of the antenna elements or an individual channel associated with any of the antenna elements in the group.

Figure 16A:
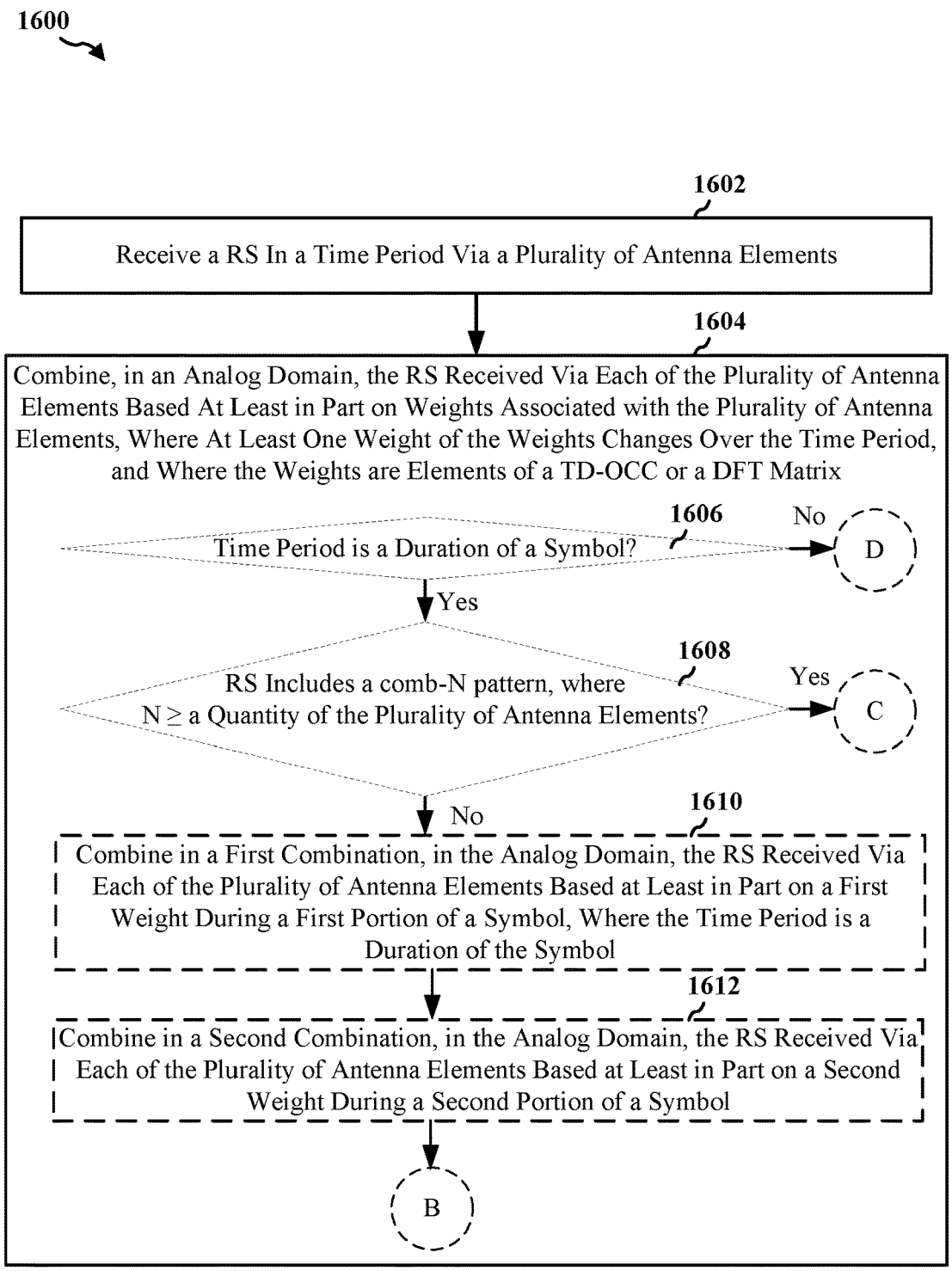

Referring to FIG. 16A, at step 1602, the network entity receives a RS in a time period via a plurality of antenna elements. For instance, step 1602 may be performed by RS reception component 1840. For example, as described above with respect to FIG. 15, the base station 1504 or a component of the base station (e.g., the RxFE of base station 1504) may receive RS 1506 in time period 1515 via the plurality of antenna elements 1512.

In one example, receiving the RS at step 1602 may include receiving a plurality of RSs including the RS, where each of the plurality of RSs may be from a different UE, each of the plurality of RSs may include an identical transmission comb number and a different cyclic shift, and the plurality of RSs may be mapped to inconsecutive subcarriers. For example, as described above with respect to FIG. 15, the base station 1504 or RxFE may receive RSs 1506, 1508 from UEs 1502, 1510 respectively. Moreover, as illustrated in and described above with respect to FIG. 9B, each of the RSs may include an identical transmission comb number (e.g., comb-2) and a different cyclic shift (e.g., cyclic shift 1 and cyclic shift 2). Thus, the RSs may be mapped to inconsecutive subcarriers (e.g., a frequency gap may exist between each tone of RSs 1 and 2 such as illustrated in FIG. 9B).

In one example, receiving the RS at step 1602 may include receiving a plurality of RSs including the RS, where each of the plurality of RSs may be from a different UE, each of the plurality of RSs may include an identical transmission comb number and a different comb offset, and the plurality of RSs may be mapped to inconsecutive subcarriers. For example, as described above with respect to FIG. 15, the base station 1504 or RxFE may receive RSs 1506, 1508 from UEs 1502, 1510 respectively. Moreover, as illustrated in and described above with respect to FIG. 9C, each of the RSs may include an identical transmission comb number (e.g., comb-4) and a different comb offset (e.g., offset 0 and offset 2). Thus, the RSs may be mapped to inconsecutive subcarriers (e.g., a frequency gap may exist between each tone of RSs 1 and 2 such as illustrated in FIG. 9C).

In one example, the plurality of antenna elements may include a first subarray and a second subarray, where the first subarray may be in a first antenna panel and the second subarray may be in a second antenna panel. In one example, the first antenna panel may be an uplink panel during the time period and the second antenna panel may be a downlink panel after the time period. For instance, referring to FIGS. 6, 10, 11 and 15, the plurality of antenna elements 608, 1008, 1108, 1512 may include subarrays 610 (e.g., a first subarray corresponding to the top 4 antenna elements in FIG. 10 and a second subarray corresponding to the bottom 4 antenna elements in FIG. 10). The subarrays may be in different antenna panels 616 (e.g., the first subarray corresponding to the top 4 antenna elements in FIG. 10 may correspond with the top antenna panel in FIG. 11, while the second subarray corresponding to the bottom 4 antenna elements in FIG. 10 may correspond with the bottom antenna panel in FIG. 11). The top antenna panel may be an uplink panel during time period 1515 (e.g., the UL antenna panel in FIG. 6), and the bottom antenna panel may be a downlink panel after time period 1515 (e.g., the DL antenna panel in FIG. 6).

At step 1604, the network entity combines, in an analog domain, the RS received via each of the plurality of antenna elements based at least in part on weights associated with the plurality of antenna elements, where at least one weight of the weights changes over the time period, and where the weights are elements of a time domain orthogonal cover code or a DFT matrix. For example, step 1604 may be performed by combination component 1842. For instance, referring to FIGS. 10-15, at block 1514, the base station 1504 or a component of the base station (e.g., the RxFE 1004) may combine in an analog domain (e.g., prior to conversion using ADC 1118 in FIG. 11), the RS 1506 received via each of the plurality of antenna elements 1512 based at least in part on analog weights (e.g., the analog weights 1015 illustrated in FIG. 10 or the analog weights illustrated in FIGS. 12 and 13). The analog weights may be associated with the plurality of antenna elements (e.g., $a_0$ is applied to adjust the phase shifter of one of the antenna elements 1008, 1208, 1308, $a_1$ is applied to adjust the phase shifter of another one of the antenna elements 1008, 1208, 1308, etc.). At least one of these analog weights changes over the time period 1515. Here, the time period may be one symbol or multiple symbols. For instance, if the time period 1515 is one symbol, the weight may change from a first weight to a second weight over symbol 1402 such as illustrated in FIG. 14. For instance, referring to FIG. 10, $a_4$, $a_5$, $a_6$, and $a_7$ may each change from positive phase 1016 during the first half of the symbol to negative phase 1022 during the second half of the symbol. Similarly, referring to FIG. 12, $a_1$, $a_2$, and $a_3$, may change from a positive phase to a negative phase or vice-versa between quarter symbols. Moreover, if the time period 1515 is multiple symbols, then a similar weight change may occur. For instance, referring to FIG. 13, $a_1$, $a_2$, and $a_3$ may change from a positive phase to a negative phase or vice-versa between different symbols. The analog weights 1015 may be elements of a TD-OCC or a DFT matrix (e.g., TD-OCC 1025, 1204, 1304).

During the combining process, at step 1606, the network entity may check if the time period (e.g., time period 1515) is a duration of a symbol (e.g., symbol 1402). If the time period is not a duration of a symbol (e.g., the time period spans multiple symbols such as in the example of FIG. 13), the network entity may continue on the flowchart to FIG. 16D. Otherwise, if the time period is a duration of a symbol (e.g., according to the examples of FIGS. 10-12), then the network entity may proceed to step 1608. At step 1608, the network entity may check whether the RS includes a comb-N pattern (a transmission comb number N), where N≥a quantity of the plurality of antenna elements. If so (e.g., as indicated in the example of FIG. 12), then the network entity may continue on the flowchart to FIG. 16C. Otherwise (e.g., as indicated in the example of FIGS. 10-11), the network entity may proceed to step 1610.

In one example, the network entity may be coupled to another network entity via a plurality of TxRUs, where the plurality of antenna elements may include a plurality of antenna element subarrays, and where a first quantity of the plurality of TxRUs may be less than a second quantity of the plurality of antenna element subarrays. For instance, referring to FIGS. 6 and 11, the RxFE 604, 1104 may be coupled to baseband modem 606, 1106 via TxRUs 614, 1116, the plurality of antenna elements 608, 1108 may be divided into subarrays 610, and a quantity of the TxRUs 614, 1116 may be less than a quantity of the subarrays 610. For example, as illustrated in FIG. 11, the number of the TxRUs 1116 supported by the baseband modem 1106 (four in this example) is less than the number of subarrays, combiners 1110, or TxRUs 1112 of the RxFE 1104 (eight in this example).

In one example, where the time period is a duration of a symbol, the at least one weight may change from a first weight during a first portion of the symbol to a second weight during a second portion of the symbol. For instance, referring to FIGS. 10, 14 and 15, the time period 1515 may be the duration of symbol 1402, and the analog weight 1015 may change from first weight 1404 to second weight 1406 (or vice-versa) between different portions of symbol 1402.

In one example, at step 1610 (during the combining process of step 1604), the network entity may combine in a first combination, in the analog domain, the RS received via each of the plurality of antenna elements based at least in part on the first weight during the first portion of the symbol. For example, step 1610 may be performed by combination component 1842. Moreover, at step 1612, the network entity may combine in a second combination, in the analog domain, the RS received via each of the plurality of antenna elements based at least in part on the second weight during the second portion of the symbol. For example, step 1612 may be performed by combination component 1842. After performing these combining steps, the network entity may continue on the flowchart with FIG. 16B. For instance, referring to FIG. 15, at block 1516, the base station 1504 or a component of the base station (e.g., the RxFE) may combine in an nth one of N combinations the received RS based on a nth antenna element weight during a nth symbol portion, and at block 1518, the base station or its component (e.g., the RxFE) may repeat the aforementioned combining step for each value of n, where 1≤n≤N. In this example specifically, N=2, which case is illustrated more particularly in FIGS. 10 and 14. For instance, during the first half symbol of symbol 1402, the RxFE 1004 may form first combination 1018 as a result of applying the first OCC vector (the first column of analog weights 1015 in TD-OCC 1025) to the antenna elements 1008 and adding the received RS via each of these antenna elements 1008 using combiners 1010 and 1014. Similarly, during the second half symbol of symbol 1402, the RxFE 1004 may form second combination 1024 as a result of applying the second OCC vector (the second column of analog weights 1015 in TD-OCC 1025) to the antenna elements 1008 and again adding the received RS via each of these antenna elements 1008 using combiners 1010 and 1014. These combinations may be performed in the analog domain (e.g., prior to passing any received RS via an ADC to the baseband modem).

Referring now to FIG. 16B, in one example, at step 1614, the network entity may aggregate in a first aggregation, the RS received via each of the plurality of antenna elements based at least in part on a first function of the first combination and the second combination. For example, step 1614 may be performed by aggregation component 1844. Moreover, at step 1616, the network entity may aggregate in a second aggregation, the RS received via each of the plurality of antenna elements based at least in part on a second function of the first combination and the second combination. For example, step 1616 may be performed by aggregation component 1844. For instance, referring to FIG. 15, at block 1520, the base station 1504 or a component of the base station (e.g., the baseband modem) may aggregate in an nth one of N aggregations the received RS based on a nth function of the N combinations, and at block 1522, the base station or its component (e.g., the baseband modem) may repeat the aforementioned aggregation step for each value of n, where 1≤n≤N. In this example specifically, N=2, which case is illustrated more particularly in FIGS. 10 and 14. For instance, the baseband modem 1006 may form first aggregation 1030 as a result of applying the first function 1028 to the first combination 1018 and the second combination 1024, and similarly form second aggregation 1034 as a result of applying the second function 1032 to the first combination 1018 and the second combination 1024.

Still referring to FIG. 16B, in another example, at step 1618, the network entity may provide the first combination and the second combination to another network entity for channel estimation of a combined channel for the plurality of antenna elements. For example, step 1618 may be performed by channel estimation component 1846. For instance, referring to FIG. 15, at block 1524, the base station 1504 or a component of the base station (e.g., the RxFE) may provide the N combinations to another network entity (e.g., the baseband modem) for channel estimation of a combined channel for the antenna elements. In this example specifically, N=2, which case is illustrated more particularly in FIG. 10. For instance, the RxFE 1004 may provide first combination 1018 and second combination 1024 to the baseband modem 1006 to obtain the first aggregation 1030 and second aggregation 1034, and in response to these aggregations, the baseband modem may recover and estimate the combined channel over each of the TxRUs 1012 associated with the antenna elements 1008.

Figure 16C:
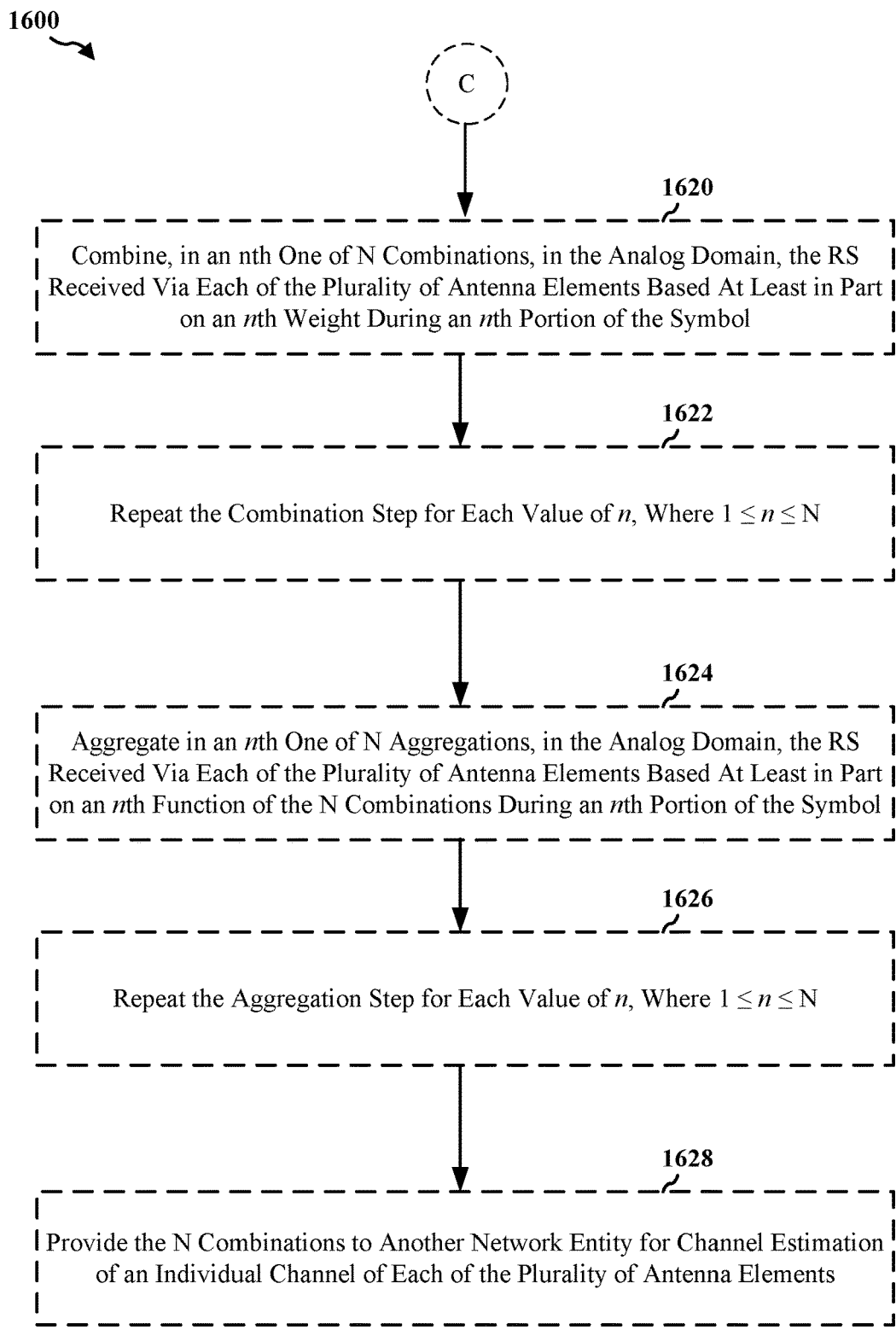

Now referring to FIG. 16C, if the RS includes a comb-N pattern (a transmission comb number N), where N≥a quantity of the plurality of antenna elements (e.g., as indicated in the example of FIG. 12), then the network entity may proceed to the steps of FIG. 16C. For instance, in one example, the plurality of antenna elements may include a plurality of antenna element subarrays, the RS may include a transmission comb number N in which the RS is mapped to inconsecutive subcarriers, and N is at least equal to a quantity of the plurality of antenna elements in one of the antenna element subarrays. For instance, referring to the example of FIG. 12, the antenna panel 1210 may include subarrays of antenna elements, where one of the subarrays includes antenna elements 1208 as illustrated (e.g., antenna elements 1208 may correspond to antenna elements 508 in one of the subarrays 510 of FIG. 5, or antenna elements 608 in one of the subarrays 610 of FIG. 6). These antenna elements 1208 include phase shifters which are adjusted by respective analog weights according to TD-OCC 1204, and the RS received via these antenna elements 1208 are added together using combiner 1212. The RS received from the UE may include a comb-N pattern in which the RS does not occupy consecutive subcarriers with another RS from a different UE (e.g., the RS satisfies a valid configuration such as those configurations illustrated in FIGS. 9B and 9C). Here, the transmission comb number N is at least equal to the number of antenna elements 1208 (e.g., N=4 in this example). Thus in this example where the combiner 1212 adds the RS received via four antenna elements in a subarray, the received RS (even after multiplexing RS of other UEs) may include at least a comb-4 pattern.

In one example, the time period may be a duration of a symbol, and the at least one weight may change at least once over N portions of the symbol. For instance, referring to FIGS. 12 and 15, the time period 1515 may be a duration of one symbol, and the analog weights (a) in the TD-OCC 1204 change at least once over the N symbol portions. For example, where N=4 as illustrated in the example of FIG. 12 and thus the symbol is divided into four symbol portions, at least one of the analog weights (e.g., $a_1$, $a_2$, and $a_3$) may change from a positive phase to a negative phase or vice-versa at least once across the four quarter symbols.

In one example, at step 1620, (during the combining process of step 1604), the network entity may combine in an nth one of N combinations, in the analog domain, the RS received via each of the plurality of antenna elements based at least in part on an nth weight during an nth portion of the symbol. For example, step 1620 may be performed by combination component 1842. Moreover, at step 1622, the network entity may repeat the combining step (step 1620) for each value of n, where 1≤n≤N. For example, step 1622 may be performed by combination component 1842. For instance, referring to FIG. 15, at block 1516, the base station 1504 or a component of the base station (e.g., the RxFE) may combine in an nth one of N combinations the received RS based on a nth antenna element weight during a nth symbol portion, and at block 1518, the base station or its component (e.g., the RxFE) may repeat the aforementioned combining step for each value of n, where 1≤n≤N. Here, N>2, such as illustrated in the example of FIG. 12 where N=4. For instance, during the first quarter symbol, the RxFE may form one combination as a result of applying the first OCC vector (the first column of analog weights in TD-OCC 1204) to the antenna elements 1208 and adding the received RS via each of these antenna elements 1208 using combiner 1212. Similarly, during the second quarter symbol, the RxFE may form another combination as a result of applying the second OCC vector (the second column of analog weights in TD-OCC 1204) to the antenna elements 1208 and again adding the received RS via each of these antenna elements 1208 using combiner 1212. The RxFE may repeat this process for all N=4 quarter symbols to arrive at four combinations. These combinations may be performed in the analog domain (e.g., prior to passing any received RS via an ADC to the baseband modem).

In one example, at step 1624, the network entity may aggregate, in an nth one of N aggregations, the RS received via each of the plurality of antenna elements based at least in part on an nth function of the N combinations. For example, step 1624 may be performed by aggregation component 1844. Moreover, at step 1626, the network entity may repeat the aggregating step (step 1624) for each value of n, where $1 \leq n \leq N$. For example, step 1626 may be performed by aggregation component 1844. For instance, referring to FIG. 15, at block 1520, the base station 1504 or a component of the base station (e.g., the baseband modem) may aggregate in an nth one of N aggregations the received RS based on a nth function of the N combinations, and at block 1522, the base station or its component (e.g., the baseband modem) may repeat the aforementioned aggregation step for each value of n, where $1 \leq n \leq N$. Here, N>2, such as illustrated in the example of FIG. 12 where N=4. For instance, the baseband modem may form one aggregation as a result of applying one function to the four obtained combinations. Similarly, the baseband modem may form another aggregation as a result of applying another function to the four obtained combinations. The baseband modem may repeat this process N=4 times to arrive at four aggregations.

In another example, at step 1628, the network entity may provide the N combinations to another network entity for channel estimation of an individual channel of each of the plurality of antenna elements. For example, step 1628 may be performed by channel estimation component 1846. For instance, referring to FIG. 15, at block 1524, the base station 1504 or a component of the base station (e.g., the RxFE) may provide the N combinations to another network entity (e.g., the baseband modem) for channel estimation of a combined channel for the antenna elements. Here, N>2, such as illustrated in the example of FIG. 12 where N=4. For instance, the RxFE may provide the four obtained combinations to the baseband modem to obtain the four aggregations, and in response to these aggregations, the baseband modem may recover and estimate the individual channel for each of the antenna elements 1208.

Figure 16D:
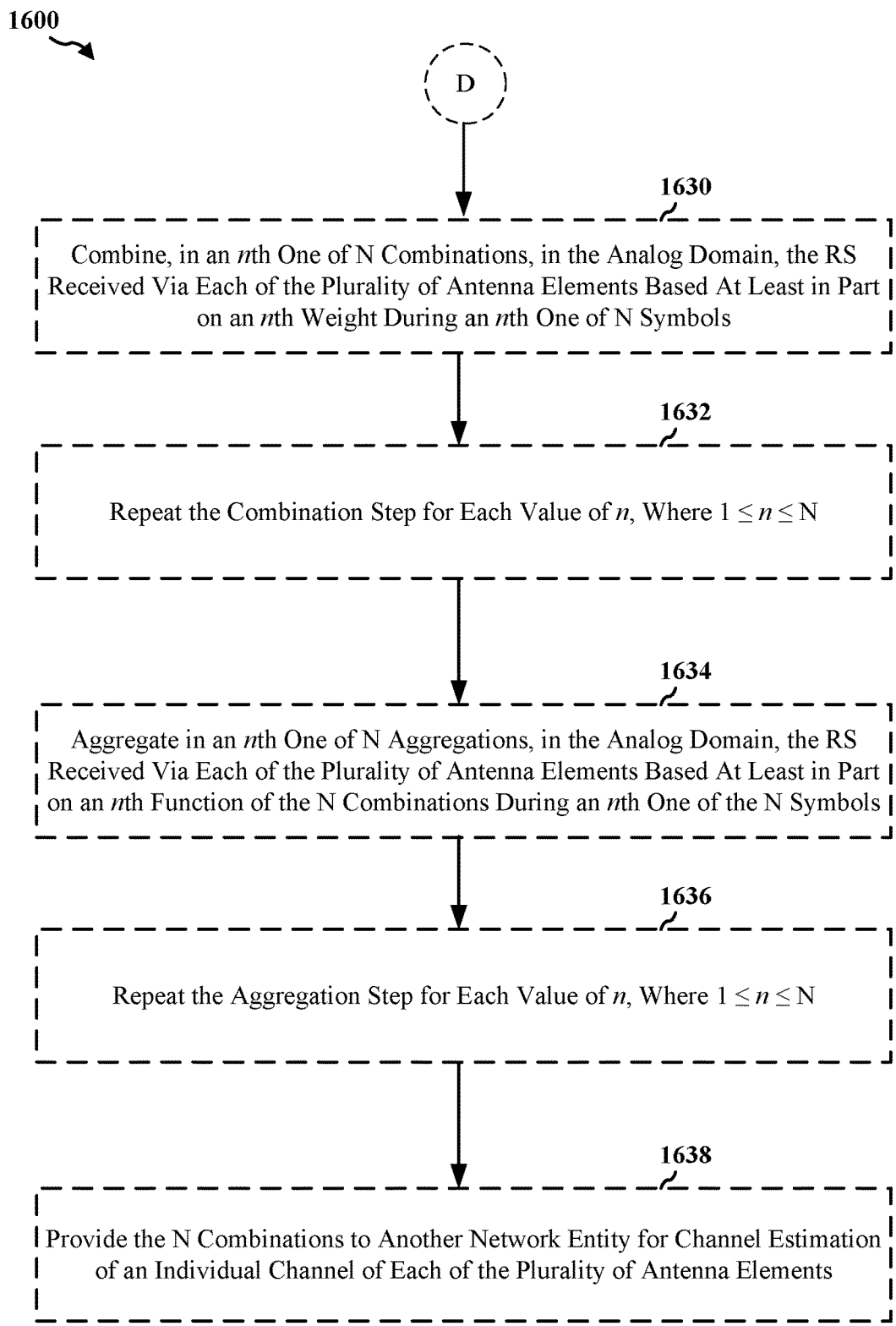

Now referring to FIG. 16D, if the time period is not a duration of a symbol (e.g., as indicated in the example of FIG. 13), then the network entity may proceed to the steps of FIG. 16D. For instance, in one example, the time period may be a duration of N symbols, and the at least one weight may change within at least one of the N symbols. For instance, referring to FIGS. 13 and 15, the time period 1515 may be a duration of multiple symbols, and the analog weights (a) in the TD-OCC 1304 change at least once over the N symbols. For example, where N=4 as illustrated in the example of FIG. 13 and thus an RS is received in each of four symbols, at least one of the analog weights (e.g., $a_1$, $a_2$, and $a_3$) may change from a positive phase to a negative phase or vice-versa at least once across the four symbols.

In one example, at step 1630, (during the combining process of step 1604), the network entity may combine in an nth one of N combinations, in the analog domain, the RS received via each of the plurality of antenna elements based at least in part on an nth weight during an nth one of the N symbols. For example, step 1630 may be performed by combination component 1842. Moreover, at step 1632, the network entity may repeat the combining step (step 1630) for each value of n, where $1 \leq n \leq N$. For example, step 1632 may be performed by combination component 1842. For instance, referring to FIG. 15, at block 1516, the base station 1504 or a component of the base station (e.g., the RxFE) may combine in an nth one of N combinations the received RS based on a nth antenna element weight during a nth one of N symbols, and at block 1518, the base station or its component (e.g., the RxFE) may repeat the aforementioned combining step for each value of n, where $1 \leq n \leq N$. Here, N>2, such as illustrated in the example of FIG. 13 where N=4. For instance, during the first symbol, the RxFE may form one combination as a result of applying the first OCC vector (the first column of analog weights in TD-OCC 1304) to the antenna elements 1308 and adding the received RS via each of these antenna elements 1308 using combiner 1312. Similarly, during the second symbol, the RxFE may form another combination as a result of applying the second OCC vector (the second column of analog weights in TD-OCC 1304) to the antenna elements 1308 and again adding the received RS via each of these antenna elements 1308 using combiner 1312. The RxFE may repeat this process for all N=4 symbols to arrive at four combinations. These combinations may be performed in the analog domain (e.g., prior to passing any received RS via an ADC to the baseband modem).

In one example, at step 1634, the network entity may aggregate in an nth one of N aggregations, the RS received via each of the plurality of antenna elements based at least in part on an nth function of the N combinations. For example, step 1634 may be performed by aggregation component 1844. Moreover, at step 1636, the network entity may repeat the aggregating step (step 1634) for each value of n, where $1 \leq n \leq N$. For example, step 1636 may be performed by aggregation component 1844. For instance, referring to FIG. 15, at block 1520, the base station 1504 or a component of the base station (e.g., the baseband modem) may aggregate in an nth one of N aggregations the received RS based on a nth function of the N combinations, and at block 1522, the base station or its component (e.g., the baseband modem) may repeat the aforementioned aggregation step for each value of n, where $1 \leq n \leq N$. Here, N>2, such as illustrated in the example of FIG. 13 where N=4. For instance, the baseband modem may form one aggregation as a result of applying one function to the four obtained combinations. Similarly, the baseband modem may form another aggregation as a result of applying another function to the four obtained combinations. The baseband modem may repeat this process N=4 times to arrive at four aggregations.

In another example, at step 1638, the network entity may provide the N combinations to another network entity for channel estimation of an individual channel of each of the plurality of antenna elements. For example, step 1638 may be performed by channel estimation component 1846. For instance, referring to FIG. 15, at block 1524, the base station 1504 or a component of the base station (e.g., the RxFE) may provide the N combinations to another network entity (e.g., the baseband modem) for channel estimation of a combined channel for the antenna elements. Here, N>2, such as illustrated in the example of FIG. 13 where N=4. For instance, the RxFE may provide the four obtained combinations to the baseband modem to obtain the four aggregations, and in response to these aggregations, the baseband modem may recover and estimate the individual channel for each of the antenna elements 1308.

Finally, referring back to FIG. 16A, where the time period is a duration of a symbol, the at least one weight may be a first weight before a transition time of the at least one weight during the symbol and a second weight after the transition time of the at least one weight during the symbol. For instance, referring to FIGS. 10, 12, 14 and 15, the time period 1515 may be the duration of symbol 1402, and the analog weight (e.g., the analog weights 1015 in the TD-OCC 1025 of FIG. 10, or the analog weights in the TD-OCC 1204) may change between different portions of the symbol 1402. For example, an analog weight may change from first weight 1404 to second weight 1406 after the transition time 1408.

In one example, the RS received during the transition time may be discarded before channel estimation of a channel associated with at least one of the plurality of antenna elements. For instance, referring to FIGS. 10, 12, 14 and 15, at block 1519, the base station or a component of the base station (e.g., the RxFE) may discard samples of the RS which are received during the transition time 1408 of the analog weight (e.g., the analog weights 1015 in the TD-OCC 1025 of FIG. 10, or the analog weights in the TD-OCC 1204) within time period 1515 (e.g., symbol 1402). These RS samples may be discarded before the baseband modem estimates a combined channel associated with a TxRU (e.g., TxRU 1012) or estimates an individual channel associated with an antenna element (e.g., antenna element 1008, 1208). For example, when the RxFE combines the received RS (e.g., using combiners 1010, 1014 or combiner 1212 during block 1514), the RxFE may obtain combinations from samples of the RS received outside transition time 1408 (when the analog weight is not changing or is stable). The combinations may be obtained, for example, according to Equations 9 and 10 above (or based on similar equations which exclude RS received during transition times). After obtaining these combinations, the RxFE may provide the combinations to the baseband modem to aggregate as previously described. The baseband modem may then recover and estimate the channels based on the aggregations accordingly.

In one example, the at least one weight may change during the transition time of the symbol, and the RS received during at least one other time than the transition time may be further discarded before the channel estimation. For instance, referring to FIG. 14, the analog weight (e.g., the analog weights 1015 in the TD-OCC 1025 of FIG. 10, or the analog weights in the TD-OCC 1204) may change within symbol 1402 from first weight 1404 to second weight 1406 during transition time 1408. Moreover, the analog weight may change weights again during symbol 1402 during another transition time (e.g., the half portion of transition time 1408 illustrated at the right of FIG. 14). In such case, referring to FIGS. 10, 12, 14 and 15, at block 1519, the base station or a component of the base station (e.g., the RxFE) may similarly discard samples of the RS which are received during this transition time portion (e.g., the half portion of the transition time illustrated in FIG. 14). These RS samples may similarly be discarded before the baseband modem estimates a combined channel associated with a TxRU (e.g., TxRU 1012) or estimates an individual channel associated with an antenna element (e.g., antenna element 1008, 1208). For example, when the RxFE combines the received RS (e.g., using combiners 1010, 1014 or combiner 1212 during block 1514), the RxFE may obtain combinations from samples of the RS received outside this transition time portion (when the analog weight is not changing or is stable). The combinations may be obtained, for example, according to Equations 9 and 10 above (or based on similar equations which exclude RS received during the transition time portion). After obtaining these combinations, the RxFE may provide the combinations to the baseband modem to aggregate as previously described. The baseband modem may then recover and estimate the channels based on the aggregations accordingly.

FIG. 17 is a flowchart 1700 of a method of wireless communication. The method may be performed by a UE (e.g., the UE 104, 350, 1502; the apparatus 1902). The method allows a UE to transmit an RS configured from a restricted set of valid configurations in order to allow the base station to perform analog combining of the RS even when the RS is multiplexed with an RS from a different UE (e.g., UE 1510).

At step 1702, the UE receives a configuration indicating a transmission comb number for an RS, where the configuration is part of a restricted set of RS configurations for analog combining. For example, step 1702 may be performed by configuration component 1940. The configuration may further indicate a transmission comb offset or an RS port allocation for the RS. For instance, referring to FIG. 15, the UE 1502 may receive from the base station 1504 or from a component of the base station (e.g., the RxFE), configuration 1505 for RS 1506 from the UE 1502. The configuration 1505 may indicate a restricted set of valid RS configurations for analog combining. For instance, the configuration may indicate a transmission comb number or pattern, as well as a comb offset, a cyclic shift, or an RS port allocation, which the UE is to apply to its RS to prevent the base station from receiving a multiplexed signal with an invalid configuration such as illustrated in FIG. 9A (e.g., where the RSs are received in consecutive subcarriers). For example, the configuration 1505 may indicate transmission comb numbers with cyclic shifts or comb offsets from any of the valid configurations of FIGS. 9B and 9C, or from any other such configuration which results in the RS from the UE having a comb-N pattern (where N≥2) which satisfies an identity property to be applied by the base station in its analog combining.

In one example, the RS may include an identical transmission comb number and a different cyclic shift as those of another RS from a different UE in response to the configuration, where the RS and the another RS are mapped to inconsecutive subcarriers with respect to each other. For example, as described above with respect to FIG. 15, the base station 1504 or RxFE may receive RSs 1506, 1508 from UEs 1502, 1510 respectively. Moreover, as illustrated in and described above with respect to FIG. 9B, each of the RSs may include an identical transmission comb number (e.g., comb-2) and a different cyclic shift (e.g., cyclic shift 1 and cyclic shift 2). Thus, the RSs may be mapped to inconsecutive subcarriers (e.g., a frequency gap may exist between each tone of RSs 1 and 2 such as illustrated in FIG. 9B).

In one example, the RS may include an identical transmission comb number and a different comb offset as those of another RS from a different UE in response to the configuration, where the RS and the another RS are mapped to inconsecutive subcarriers with respect to each other. For example, as described above with respect to FIG. 15, the base station 1504 or RxFE may receive RSs 1506, 1508 from UEs 1502, 1510 respectively. Moreover, as illustrated in and described above with respect to FIG. 9C, each of the RSs may include an identical transmission comb number (e.g., comb-4) and a different comb offset (e.g., offset 0 and offset 2). Thus, the RSs may be mapped to inconsecutive subcarriers (e.g., a frequency gap may exist between each tone of RSs 1 and 2 such as illustrated in FIG. 9C).

At step 1704, the UE transmits the RS in response to the configuration. For example, step 1704 may be performed by RS transmission component 1942. For example, as described above with respect to FIG. 15, the UE 1502 may transmit to base station 1504 or to a component of the base station (e.g., the RxFE of base station 1504) the RS 1506 in response to the configuration 1505.

Figure 18:
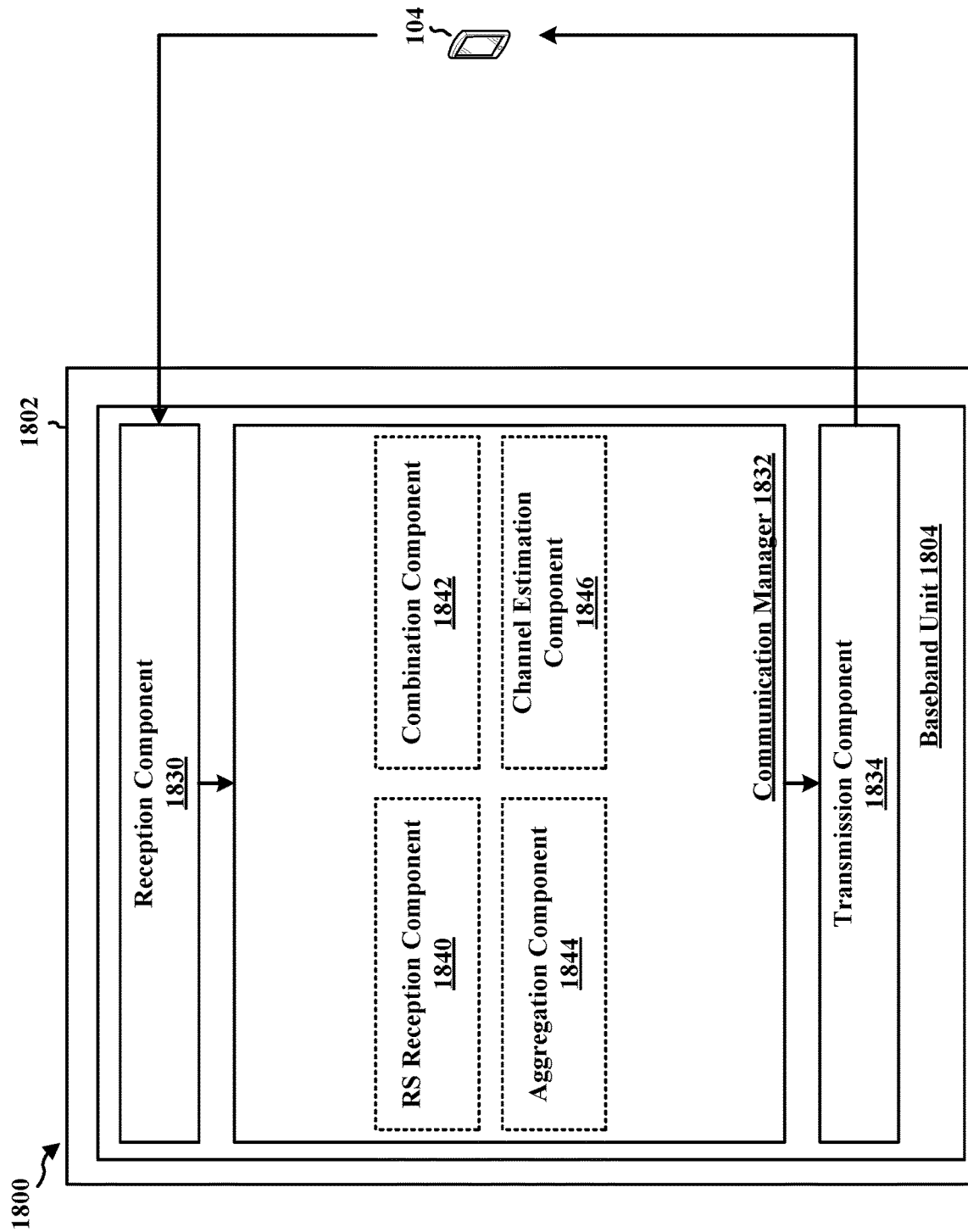
FIG. 18 is a diagram illustrating an example of a hardware implementation for an example apparatus.

FIG. 18 is a diagram 1800 illustrating an example of a hardware implementation for an apparatus 1802. The apparatus 1802 is a BS and includes a baseband unit 1804. The baseband unit 1804 may communicate through a cellular RF transceiver with the UE 104. The baseband unit 1804 may include a computer-readable medium/memory. The baseband unit 1804 is responsible for general processing, including the execution of software stored on the computer-readable medium/memory. The computer-readable medium/memory may be non-transitory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the BS 310 and may include the memory 376 and/or at least one of the TX processor 316, the RX processor 370, and the controller/processor 375.

The communication manager 1832 includes an RS reception component 1840, a combination component 1842, an aggregation component 1844, and a channel estimation component 1846. The RS reception component 1840 is configured to receive a RS in a time period via a plurality of antenna elements, e.g., as described in connection with 1602. The combination component 1842 is configured to combine, in an analog domain, the RS received via each of the plurality of antenna elements based at least in part on weights associated with the plurality of antenna elements, where at least one weight of the weights changes over the time period, and where the weights are elements of a time domain orthogonal cover code or a DFT matrix, e.g., as described in connection with 1604.

In one configuration, the time period is a duration of a symbol, and the at least one weight changes from a first weight during a first portion of the symbol to a second weight during a second portion of the symbol. In response, the combination component 1842 is further configured to combine in a first combination, in the analog domain, the RS received via each of the plurality of antenna elements based at least in part on the first weight during the first portion of the symbol, e.g., as described in connection with 1610. The combination component 1842 is further configured to combine in a second combination, in the analog domain, the RS received via each of the plurality of antenna elements based at least in part on the second weight during the second portion of the symbol, e.g., as described in connection with 1612. The aggregation component 1844 is configured to aggregate in a first aggregation, the RS received via each of the plurality of antenna elements based at least in part on a first function of the first combination and the second combination, e.g., as described in connection with 1614. The aggregation component 1844 is further configured to aggregate in a second aggregation, the RS received via each of the plurality of antenna elements based at least in part on a second function of the first combination and the second combination, e.g., as described in connection with 1616. The channel estimation component 1846 is configured to provide the first combination and the second combination to another network entity for channel estimation of a combined channel for the plurality of antenna elements, e.g., as described in connection with 1618.

In one configuration, the time period is a duration of a symbol, and the at least one weight changes at least once over N portions of the symbol. In response, the combination component 1842 is further configured to combine in an nth one of N combinations, in the analog domain, the RS received via each of the plurality of antenna elements based at least in part on an nth weight during an nth portion of the symbol, e.g., as described in connection with 1620. The combination component 1842 is further configured to repeat this combining step for each value of n, where $1 \le n \le N$, e.g., as described in connection with 1622. The aggregation component 1844 is further configured to aggregate in an nth one of N aggregations, the RS received via each of the plurality of antenna elements based at least in part on an nth function of the N combinations, e.g., as described in connection with 1624. The aggregation component 1844 is further configured to repeat this aggregating step for each value of n, where $1 \le n \le N$, e.g., as described in connection with 1626. The channel estimation component 1846 is further configured to provide the N combinations to another network entity for channel estimation of an individual channel of each of the plurality of antenna elements, e.g., as described in connection with 1628.

In one configuration, the time period is a duration of N symbols, and the at least one weight changes within at least one of the N symbols. In response, the combination component 1842 is further configured to combine in an nth one of N combinations, in the analog domain, the RS received via each of the plurality of antenna elements based at least in part on an nth weight during an nth one of the N symbols, e.g., as described in connection with 1630. The combination component 1842 is further configured to repeat this combining step for each value of n, where $1 \le n \le N$, e.g., as described in connection with 1632. The aggregation component 1844 is further configured to aggregate in an nth one of N aggregations, the RS received via each of the plurality of antenna elements based at least in part on an nth function of the N combinations, e.g., as described in connection with 1634. The aggregation component 1844 is further configured to repeat this aggregating step for each value of n, where $1 \le n \le N$, e.g., as described in connection with 1636. The channel estimation component 1846 is further configured to provide the N combinations to another network entity for channel estimation of an individual channel of each of the plurality of antenna elements, e.g., as described in connection with 1638.

The apparatus may include additional components that perform each of the blocks of the algorithm in the aforementioned flowcharts of FIGS. 16A-16D. As such, each block in the aforementioned flowcharts of FIGS. 16A-16D may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the baseband unit 1804, includes means for receiving a reference signal (RS) in a time period via a plurality of antenna elements; and means for combining, in an analog domain, the RS received via each of the plurality of antenna elements based at least in part on weights associated with the plurality of antenna elements, wherein at least one weight of the weights changes over the time period, and wherein the weights are elements of a time domain orthogonal cover code or a DFT matrix.

In one configuration, receiving the RS includes receiving a plurality of RSs including the RS; wherein each of the plurality of RSs is from a different user equipment (UE), each of the plurality of RSs include an identical transmission comb number and a different cyclic shift, and the plurality of RSs are mapped to inconsecutive subcarriers.

In one configuration, receiving the RS includes receiving a plurality of RSs including the RS; wherein each of the plurality of RSs is from a different user equipment (UE), each of the plurality of RSs include an identical transmission comb number and a different comb offset, and the plurality of RSs are mapped to inconsecutive subcarriers.

In one configuration, the plurality of antenna elements includes a first subarray and a second subarray, and wherein the first subarray is in a first antenna panel and the second subarray is in a second antenna panel. In one configuration, the first antenna panel is an uplink panel during the time period and the second antenna panel is a downlink panel after the time period.

In one configuration, the network entity is coupled to another network entity via a plurality of TxRUs, wherein the plurality of antenna elements includes a plurality of antenna element subarrays, and wherein a first quantity of the plurality of TxRUs is less than a second quantity of the plurality of antenna element subarrays. In one configuration, the time period is a duration of a symbol, and the at least one weight changes from a first weight during a first portion of the symbol to a second weight during a second portion of the symbol. In one configuration, the means for combining is further configured to combine in a first combination, in the analog domain, the RS received via each of the plurality of antenna elements based at least in part on the first weight during the first portion of the symbol; and to combine in a second combination, in the analog domain, the RS received via each of the plurality of antenna elements based at least in part on the second weight during the second portion of the symbol. In one configuration, the apparatus 1802, and in particular the baseband unit 1804, includes means for aggregating in a first aggregation, the RS received via each of the plurality of antenna elements based at least in part on a first function of the first combination and the second combination; wherein the means for aggregating is further configured to aggregate in a second aggregation, the RS received via each of the plurality of antenna elements based at least in part on a second function of the first combination and the second combination. In one configuration, the apparatus 1802, and in particular the baseband unit 1804, includes means for providing the first combination and the second combination to another network entity for channel estimation of a combined channel for the plurality of antenna elements.

In one configuration, the plurality of antenna elements includes a plurality of antenna element subarrays; wherein the RS includes a transmission comb number N in which the RS is mapped to inconsecutive subcarriers; and wherein N is at least equal to a quantity of the plurality of antenna elements in one of the antenna element subarrays. In one configuration, the time period is a duration of a symbol, and the at least one weight changes at least once over N portions of the symbol. In one configuration, the means for combining is further configured to combine in an nth one of N combinations, in the analog domain, the RS received via each of the plurality of antenna elements based at least in part on an nth weight during an nth portion of the symbol; and to repeat the combining step for each value of n; wherein $1 \leq n \leq N$. In one configuration, the apparatus 1802, and in particular the baseband unit 1804, includes means for aggregating in an nth one of N aggregations, the RS received via each of the plurality of antenna elements based at least in part on an nth function of the N combinations; and wherein the means for aggregating is further configured to repeat the aggregating step for each value of n; wherein $1 \leq n \leq N$. In one configuration, the apparatus 1802, and in particular the baseband unit 1804, includes means for providing the N combinations to another network entity for channel estimation of an individual channel of each of the plurality of antenna elements.

In one configuration, the time period is a duration of N symbols, and the at least one weight changes within at least one of the N symbols. In one configuration, the means for combining is further configured to combine in an nth one of N combinations, in the analog domain, the RS received via each of the plurality of antenna elements based at least in part on an nth weight during an nth one of the N symbols; and to repeat the combining step for each value of n; wherein $1 \leq n \leq N$. In one configuration, the apparatus 1802, and in particular the baseband unit 1804, includes means for aggregating in an nth one of N aggregations, the RS received via each of the plurality of antenna elements based at least in part on an nth function of the N combinations; wherein the means for aggregating is further configured to repeat the aggregating step for each value of n; wherein $1 \leq n \leq N$. In one configuration, the apparatus 1802, and in particular the baseband unit 1804, includes means for providing the N combinations to another network entity for channel estimation of an individual channel of each of the plurality of antenna elements.

In one configuration, the time period is a duration of a symbol, and the at least one weight is a first weight before a transition time of the at least one weight during the symbol and a second weight after the transition time of the at least one weight during the symbol. In one configuration, the RS received during the transition time is discarded before channel estimation of a channel associated with at least one of the plurality of antenna elements. In one configuration, the at least one weight changes during the transition time of the symbol, and wherein the RS received during at least one other time than the transition time is further discarded before the channel estimation.

The aforementioned means may be one or more of the aforementioned components of the apparatus 1802 configured to perform the functions recited by the aforementioned means. As described supra, the apparatus 1802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 19:
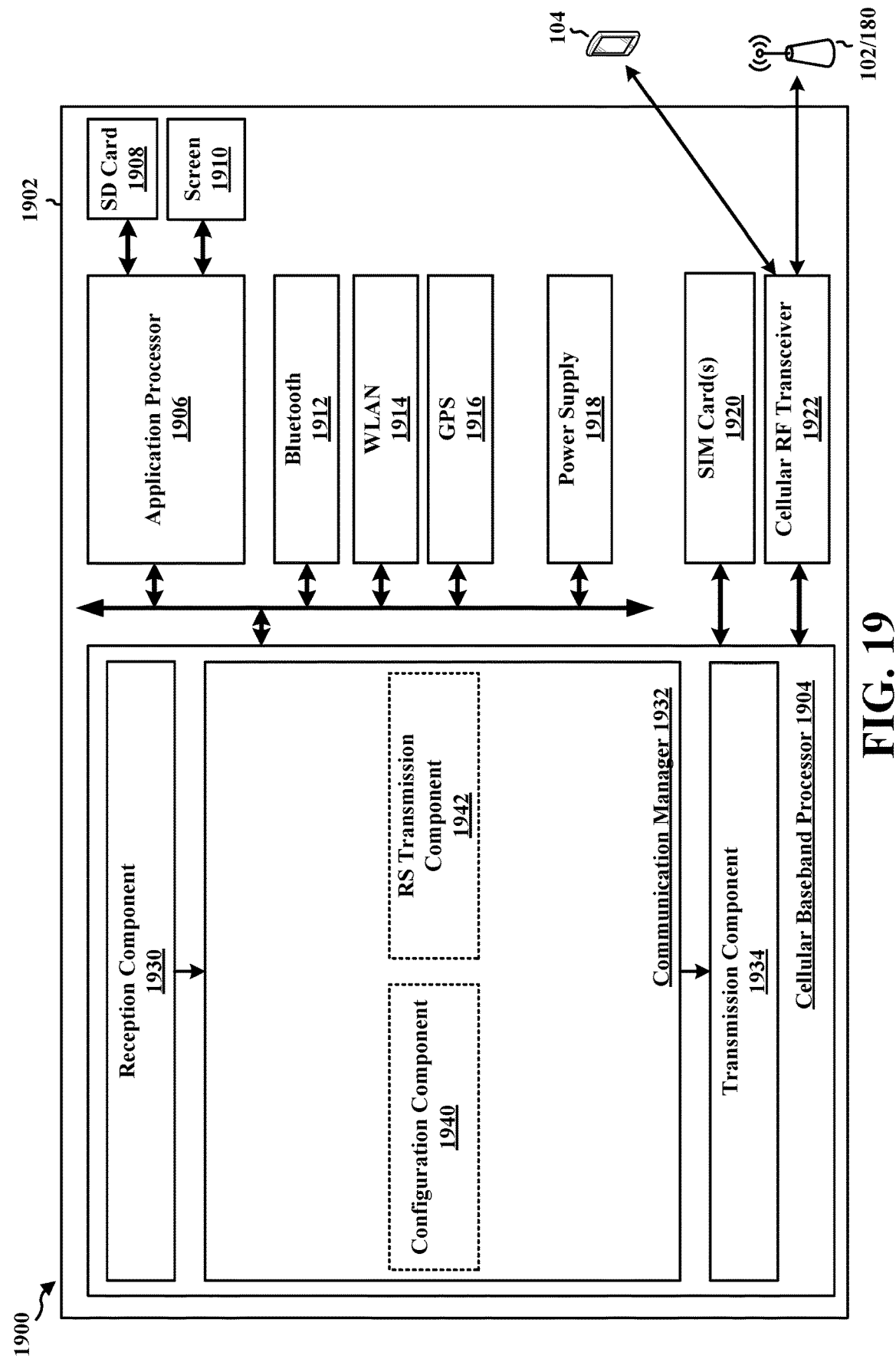
FIG. 19 is a diagram illustrating another example of a hardware implementation for another example apparatus.

FIG. 19 is a diagram 1900 illustrating an example of a hardware implementation for an apparatus 1902. The apparatus 1902 is a UE and includes a cellular baseband processor 1904 (also referred to as a modem) coupled to a cellular RF transceiver 1922 and one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and a power supply 1918. The cellular baseband processor 1904 communicates through the cellular RF transceiver 1922 with the UE 104 and/or BS 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. The cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., see 350 of FIG. 3) and include the aforediscussed additional modules of the apparatus 1902.

The communication manager 1932 includes a configuration component 1940 that is configured to receive a configuration indicating a transmission comb number for an RS, where the configuration is part of a restricted set of RS configurations for analog combining, e.g., as described in connection with 1702. The communication manager 1932 further includes a RS transmission component 1942 that is configured to transmit the RS in response to the configuration, e.g., as described in connection with 1704.

The apparatus may include additional components that perform each of the blocks of the algorithm in the aforementioned flowchart of FIG. 17. As such, each block in the aforementioned flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the cellular baseband processor 1904, includes means for receiving a configuration indicating a transmission comb number for an RS, where the configuration is part of a restricted set of RS configurations for analog combining, and means for transmitting the RS in response to the configuration.

The aforementioned means may be one or more of the aforementioned components of the apparatus 1902 configured to perform the functions recited by the aforementioned means. As described supra, the apparatus 1902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Accordingly, aspects of the present disclosure allow a base station to consider an identity property for a received RS during analog combining or aggregation in order to achieve efficient channel sounding and estimation. The base station may utilize this identity property when performing analog combining to increase the number of antenna elements considered in a single combination and thereby reduce the number of RS transmissions from a UE. Since at least one of the analog weights in one set may be different than a corresponding weight in the other set (the analog weights are elements of a TD-OCC or a DFT matrix), the base station may apply these weights to obtain multiple aggregations of the combinations, thereby allowing the base station to recover each of the combined signals output from the combiners to respective TxRUs for channel estimation. Thus, even in cases where the number of TxRUs the baseband modem can support is less than the number of TxRUs of the RxFE, by utilizing this identity property, the base station may estimate multiple combined channels associated with a single received RS during a symbol via different groups of antenna elements, thereby providing improvements to UE energy efficiency, efficient resource allocation, and coherency between the antenna elements.

Additionally, aspects of the present disclosure allow the base station to apply various different sets of analog weights, at least equivalent in number to the quantity N of antenna elements combined in a given subarray or group, in order to recover and estimate the channel associated with each individual antenna element when performing analog combining based on an identity property. For instance, the base station may utilize N different changes in analog weights to apply N different combinations at different times and N different aggregations of the various combinations in order to recover and estimate the individual channels over each of the antenna elements of any given subarray or combined group of antenna elements in the RxFE. This technique may be applied in cases where the number of TxRUs the baseband modem supports is less than the number of TxRUs of the RxFE, and thus may result in individual channel recovery and estimation from a single RS with similar improvements to UE energy efficiency, efficient resource allocation, and coherency between the antenna elements. Alternatively, this technique may be applied in cases where the number of TxRUs the baseband modem supports is at least equal to the number of TxRUs of the RxFE, and thus may also result in individual channel recovery and estimation from either a single RS or from multiple RSs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is an apparatus for wireless communication, comprising: a processor; memory coupled with the processor; and instructions stored in the memory and operable, when executed by the processor, to cause the apparatus to: receive a reference signal (RS) in a time period via a plurality of antenna elements; and combine, in an analog domain, the RS received via each of the plurality of antenna elements based at least in part on weights associated with the plurality of antenna elements, wherein at least one weight of the weights changes over the time period, and wherein the weights are elements of a time domain orthogonal cover code or a DFT matrix.

Example 2 is the apparatus of Example 1, wherein receiving the RS includes receiving a plurality of RSs including the RS; wherein each of the plurality of RSs is from a different user equipment (UE), each of the plurality of RSs include an identical transmission comb number and a different cyclic shift, and the plurality of RSs are mapped to inconsecutive subcarriers.

Example 3 is the apparatus of Example 1, wherein receiving the RS includes receiving a plurality of RSs including the RS; wherein each of the plurality of RSs is from a different user equipment (UE), each of the plurality of RSs include an identical transmission comb number and a different comb offset, and the plurality of RSs are mapped to inconsecutive subcarriers.

Example 4 is the apparatus of any of Examples 1 to 3, wherein the plurality of antenna elements includes a first subarray and a second subarray, and wherein the first subarray is in a first antenna panel and the second subarray is in a second antenna panel.

Example 5 is the apparatus of Example 4, wherein the first antenna panel is an uplink panel during the time period and the second antenna panel is a downlink panel after the time period.

Example 6 is the apparatus of any of Examples 1 to 5, wherein the network entity is coupled to another network entity via a plurality of transceiver units (TxRUs), wherein the plurality of antenna elements includes a plurality of antenna element subarrays, and wherein a first quantity of the plurality of TxRUs is less than a second quantity of the plurality of antenna element subarrays.

Example 7 is the apparatus of Example 6, wherein the time period is a duration of a symbol, and the at least one weight changes from a first weight during a first portion of the symbol to a second weight during a second portion of the symbol.

Example 8 is the apparatus of Example 7, wherein the instructions, when executed by the processor, further cause the apparatus to: combine in a first combination, in the analog domain, the RS received via each of the plurality of antenna elements based at least in part on the first weight during the first portion of the symbol; and combine in a second combination, in the analog domain, the RS received via each of the plurality of antenna elements based at least in part on the second weight during the second portion of the symbol.

Example 9 is the apparatus of Example 8, wherein the instructions, when executed by the processor, further cause the apparatus to: aggregate in a first aggregation, the RS received via each of the plurality of antenna elements based at least in part on a first function of the first combination and the second combination; and aggregate in a second aggregation, the RS received via each of the plurality of antenna elements based at least in part on a second function of the first combination and the second combination.

Example 10 is the apparatus of Example 8, wherein the instructions, when executed by the processor, further cause the apparatus to: provide the first combination and the second combination to another network entity for channel estimation of a combined channel for the plurality of antenna elements.

Example 11 is the apparatus of any of Examples 1 to 10, wherein the plurality of antenna elements includes a plurality of antenna element subarrays; wherein the RS includes a transmission comb number N in which the RS is mapped to inconsecutive subcarriers; and wherein N is at least equal to a quantity of the plurality of antenna elements in one of the antenna element subarrays.

Example 12 is the apparatus of Example 11, wherein the time period is a duration of a symbol, and the at least one weight changes at least once over N portions of the symbol.

Example 13 is the apparatus of Example 12, wherein the instructions, when executed by the processor, further cause the apparatus to: combine in an nth one of N combinations, in the analog domain, the RS received via each of the plurality of antenna elements based at least in part on an nth weight during an nth portion of the symbol; and repeat the combining step for each value of n; wherein $1 \leq n \leq N$.

Example 14 is the apparatus of Example 13, wherein the instructions, when executed by the processor, further cause the apparatus to: aggregate in an nth one of N aggregations, the RS received via each of the plurality of antenna elements based at least in part on an nth function of the N combinations; and repeat the aggregating step for each value of n; wherein 1≤n≤N.

Example 15 is the apparatus of Example 13, wherein the instructions, when executed by the processor, further cause the apparatus to: provide the N combinations to another network entity for channel estimation of an individual channel of each of the plurality of antenna elements.

Example 16 is the apparatus of Example 1, wherein the time period is a duration of N symbols, and the at least one weight changes within at least one of the N symbols.

Example 17 is the apparatus of Example 16, wherein the instructions, when executed by the processor, further cause the apparatus to: combine in an nth one of N combinations, in the analog domain, the RS received via each of the plurality of antenna elements based at least in part on an nth weight during an nth one of the N symbols; and repeat the combining step for each value of n; wherein 1≤n≤N.

Example 18 is the apparatus of Example 17, wherein the instructions, when executed by the processor, further cause the apparatus to: aggregate in an nth one of N aggregations, the RS received via each of the plurality of antenna elements based at least in part on an nth function of the N combinations; and repeat the aggregating step for each value of n; wherein 1≤n≤N.

Example 19 is the apparatus of Example 17, wherein the instructions, when executed by the processor, further cause the apparatus to: provide the N combinations to another network entity for channel estimation of an individual channel of each of the plurality of antenna elements.

Example 20 is the apparatus of any of Examples 1 to 15, wherein the time period is a duration of a symbol, and the at least one weight is a first weight before a transition time of the at least one weight during the symbol and a second weight after the transition time of the at least one weight during the symbol.

Example 21 is the apparatus of Example 20, wherein the RS received during the transition time is discarded before channel estimation of a channel associated with at least one of the plurality of antenna elements.

Example 22 is the apparatus of Example 21, wherein the at least one weight changes during the transition time of the symbol, and wherein the RS received during at least one other time than the transition time is further discarded before the channel estimation.

Example 23 is a method of wireless communication at a network entity, comprising: receiving a reference signal (RS) in a time period via a plurality of antenna elements; and combining, in an analog domain, the RS received via each of the plurality of antenna elements based at least in part on weights associated with the plurality of antenna elements, wherein at least one weight of the weights changes over the time period, and wherein the weights are elements of a time domain orthogonal cover code or a DFT matrix.

Example 24 is an apparatus for wireless communication, comprising: means for receiving a reference signal (RS) in a time period via a plurality of antenna elements; and means for combining, in an analog domain, the RS received via each of the plurality of antenna elements based at least in part on weights associated with the plurality of antenna elements, wherein at least one weight of the weights changes over the time period, and wherein the weights are elements of a time domain orthogonal cover code or a DFT matrix.

Example 25 is the apparatus of Example 24, wherein the plurality of antenna elements includes a plurality of antenna element subarrays; wherein the RS includes a transmission comb number N in which the RS is mapped to inconsecutive subcarriers; and wherein N is at least equal to a quantity of the plurality of antenna elements in one of the antenna element subarrays.

Example 26 is the apparatus of Example 25, wherein the time period is a duration of a symbol, and the at least one weight changes at least once over N portions of the symbol.

Example 27 is the apparatus of Example 26, wherein the means for combining is further configured to: combine in an nth one of N combinations, in the analog domain, the RS received via each of the plurality of antenna elements based at least in part on an nth weight during an nth portion of the symbol; and repeat the combining step for each value of n; wherein 1≤n≤N.

Example 28 is the apparatus of Example 27, further comprising: means for aggregating in an nth one of N aggregations, the RS received via each of the plurality of antenna elements based at least in part on an nth function of the N combinations; and wherein the means for aggregating is further configured to repeat the aggregating step for each value of n; wherein 1≤n≤N.

Example 29 is the apparatus of Example 27, further comprising: means for providing the N combinations to another network entity for channel estimation of an individual channel of each of the plurality of antenna elements.

Example 30 is a non-transitory computer-readable medium storing computer executable code, the code when executed by a processor cause the processor to: receive a reference signal (RS) in a time period via a plurality of antenna elements; and combine, in an analog domain, the RS received via each of the plurality of antenna elements based at least in part on weights associated with the plurality of antenna elements, wherein at least one weight of the weights changes over the time period, and wherein the weights are elements of a time domain orthogonal cover code or a DFT matrix.

What is claimed is:

1. An apparatus for wireless communication, comprising:
one or more processors;
one or more memories coupled with the one or more processors; and
instructions stored in the one or more memories and operable, when executed by the one or more processors, to cause the apparatus to:
receive a plurality of reference signals, including a reference signal, in a time period via a plurality of antenna elements,
wherein each of the plurality of reference signals is from a different user equipment (UE), each of the plurality of reference signals include an identical transmission comb number, each of the plurality of reference signals include at least one of a different cyclic shift or a different comb offset, and the plurality of reference signals are mapped to inconsecutive subcarriers; and
combine, in an analog domain, the reference signal received via each of the plurality of antenna elements based at least in part on weights associated with the plurality of antenna elements,
wherein at least one weight of the weights changes over the time period, and
wherein the weights are elements of a time domain orthogonal cover code or a discrete Fourier transform (DFT) matrix.

2. The apparatus of claim 1,
wherein each of the plurality of reference signals include the different cyclic shift.

3. The apparatus of claim 1,
wherein each of the plurality of reference signals include the different comb offset.

4. The apparatus of claim 1, wherein the plurality of antenna elements includes a first subarray and a second subarray, and
wherein the first subarray is in a first antenna panel and the second subarray is in a second antenna panel.

5. The apparatus of claim 4, wherein the first antenna panel is an uplink panel during the time period and the second antenna panel is a downlink panel after the time period.

6. The apparatus of claim 1, wherein the apparatus is a network entity is coupled to another network entity via a plurality of transceiver units (TxRUs),
wherein the plurality of antenna elements includes a plurality of antenna element subarrays, and
wherein a first quantity of the plurality of TxRUs is less than a second quantity of the plurality of antenna element subarrays.

7. The apparatus of claim 6, wherein the time period is a duration of a symbol, and the at least one weight changes from a first weight during a first portion of the symbol to a second weight during a second portion of the symbol.

8. The apparatus of claim 7, wherein the instructions, when executed by the one or more processors, further cause the apparatus to:
combine in a first combination, in the analog domain, the reference signal received via each of the plurality of antenna elements based at least in part on the first weight during the first portion of the symbol; and
combine in a second combination, in the analog domain, the reference signal received via each of the plurality of antenna elements based at least in part on the second weight during the second portion of the symbol.

9. The apparatus of claim 8, wherein the instructions, when executed by the one or more processors, further cause the apparatus to:
aggregate in a first aggregation, the reference signal received via each of the plurality of antenna elements based at least in part on a first function of the first combination and the second combination; and
aggregate in a second aggregation, the reference signal received via each of the plurality of antenna elements based at least in part on a second function of the first combination and the second combination.

10. The apparatus of claim 8, wherein the instructions, when executed by the one or more processors, further cause the apparatus to:
provide the first combination and the second combination to the another network entity for channel estimation of a combined channel for the plurality of antenna elements.

11. The apparatus of claim 1,
wherein the plurality of antenna elements includes a plurality of antenna element subarrays;
wherein the reference signal includes a transmission comb number N in which the reference signal is mapped to inconsecutive subcarriers; and
wherein N is at least equal to a quantity of the plurality of antenna elements in one of the antenna element subarrays.

12. The apparatus of claim 1, wherein the time period is a duration of N symbols, and the at least one weight changes within at least one of the N symbols.

13. The apparatus of claim 12, wherein the instructions, when executed by the one or more processors, further cause the apparatus to:
combine in an nth one of N combinations, in the analog domain, the reference signal received via each of the plurality of antenna elements based at least in part on an nth weight during an nth one of the N symbols; and
repeat the combining for each value of n;
wherein $1 \leq n \leq N$.

14. The apparatus of claim 13, wherein the instructions, when executed by the one or more processors, further cause the apparatus to:
aggregate in an nth one of N aggregations, the reference signal received via each of the plurality of antenna elements based at least in part on an nth function of the N combinations; and
repeat the aggregating for each value of n;
wherein $1 \leq n \leq N$.

15. The apparatus of claim 13, wherein the instructions, when executed by the one or more processors, further cause the apparatus to:
provide the N combinations to another network entity for channel estimation of an individual channel of each of the plurality of antenna elements.

16. The apparatus of claim 1, wherein the time period is a duration of a symbol, and the at least one weight is a first weight before a transition time of the at least one weight during the symbol and a second weight after the transition time of the at least one weight during the symbol.

17. The apparatus of claim 16, wherein the reference signal received during the transition time is discarded before channel estimation of a channel associated with at least one of the plurality of antenna elements.

18. A method of wireless communication at a network entity, comprising:
receiving a reference signal in a time period via a plurality of antenna elements; and
combining, in an analog domain, the reference signal received via each of the plurality of antenna elements based at least in part on weights associated with the plurality of antenna elements,
wherein at least one weight of the weights changes over the time period,
wherein the weights are elements of a time domain orthogonal cover code or a discrete Fourier transform (DFT) matrix, and
wherein the time period is a duration of a symbol, and the at least one weight is a first weight before a transition time of the at least one weight during the symbol and a second weight after the transition time of the at least one weight during the symbol.

19. The method of claim 18, wherein the reference signal received during the transition time is discarded before channel estimation of a channel associated with at least one of the plurality of antenna elements.

20. The method of claim 19, wherein the at least one weight changes during the transition time of the symbol, and
wherein the reference signal received during at least one other time than the transition time is further discarded before the channel estimation.

21. An apparatus for wireless communication, comprising:
one or more processors;

one or more memories coupled with the one or more processors; and instructions stored in the one or more memories and operable, when executed by the one or more processors, to cause the apparatus to:
- receive a reference signal in a time period via a plurality of antenna elements; and
- combine, in an analog domain, the reference signal received via each of the plurality of antenna elements based at least in part on weights associated with the plurality of antenna elements,
  - wherein at least one weight of the weights changes over the time period,
  - wherein the weights are elements of a time domain orthogonal cover code or a discrete Fourier transform (DFT) matrix,
  - wherein the apparatus is a network entity is coupled to another network entity via a plurality of transceiver units (TxRUs),
  - wherein the plurality of antenna elements includes a plurality of antenna element subarrays, and
  - wherein a first quantity of the plurality of TxRUs is less than a second quantity of the plurality of antenna element subarrays.

22. The apparatus of claim 21, wherein the time period is a duration of a symbol, and the at least one weight changes from a first weight during a first portion of the symbol to a second weight during a second portion of the symbol.

23. The apparatus of claim 22, wherein the instructions, when executed by the one or more processors, further cause the apparatus to:
- combine in a first combination, in the analog domain, the reference signal received via each of the plurality of antenna elements based at least in part on the first weight during the first portion of the symbol; and
- combine in a second combination, in the analog domain, the reference signal received via each of the plurality of antenna elements based at least in part on the second weight during the second portion of the symbol.

24. The apparatus of claim 23, wherein the instructions, when executed by the one or more processors, further cause the apparatus to:
- aggregate in a first aggregation, the reference signal received via each of the plurality of antenna elements based at least in part on a first function of the first combination and the second combination; and
- aggregate in a second aggregation, the reference signal received via each of the plurality of antenna elements based at least in part on a second function of the first combination and the second combination.

25. The apparatus of claim 23, wherein the instructions, when executed by the one or more processors, further cause the apparatus to:
- provide the first combination and the second combination to the another network entity for channel estimation of a combined channel for the plurality of antenna elements.

26. An apparatus for wireless communication, comprising:
one or more processors;
one or more memories coupled with the one or more processors; and
instructions stored in the one or more memories and operable, when executed by the one or more processors, to cause the apparatus to:
- receive a reference signal in a time period via a plurality of antenna elements; and
- combine, in an analog domain, the reference signal received via each of the plurality of antenna elements based at least in part on weights associated with the plurality of antenna elements,
  - wherein at least one weight of the weights changes over the time period,
  - wherein the weights are elements of a time domain orthogonal cover code or a discrete Fourier transform (DFT) matrix,
  - wherein the plurality of antenna elements includes a plurality of antenna element subarrays;
  - wherein the reference signal includes a transmission comb number N in which the reference signal is mapped to inconsecutive subcarriers; and
  - wherein N is at least equal to a quantity of the plurality of antenna elements in one of the antenna element subarrays.

27. The apparatus of claim 26, wherein the time period is a duration of a symbol, and the at least one weight changes at least once over N portions of the symbol.

28. The apparatus of claim 27, wherein the instructions, when executed by the one or more processors, further cause the apparatus to:
- combine in an nth one of N combinations, in the analog domain, the reference signal received via each of the plurality of antenna elements based at least in part on an nth weight during an nth portion of the symbol; and
- repeat the combining for each value of n;
- wherein 1≤n≤N.

29. The apparatus of claim 28, wherein the instructions, when executed by the one or more processors, further cause the apparatus to:
- aggregate in an nth one of N aggregations, the reference signal received via each of the plurality of antenna elements based at least in part on an nth function of the N combinations; and
- repeat the aggregating for each value of n;
- wherein 1≤n≤N.

30. The apparatus of claim 28, wherein the instructions, when executed by the one or more processors, further cause the apparatus to:
- provide the N combinations to another network entity for channel estimation of an individual channel of each of the plurality of antenna elements.

* * * * *